United States Patent
Zhang et al.

(10) Patent No.: US 11,425,084 B2
(45) Date of Patent: Aug. 23, 2022

(54) DATA PROCESSING FOR MULTI-OBJECTIVE COMMUNICATION ENGAGEMENT

(71) Applicant: salesforce.com, inc., San Francisco, CA (US)

(72) Inventors: Yuxi Zhang, San Francisco, CA (US); Kexin Xie, San Mateo, CA (US); Sheng Loong Su, San Francisco, CA (US); Shrestha Basu Mallick, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 421 days.

(21) Appl. No.: 16/506,773

(22) Filed: Jul. 9, 2019

(65) Prior Publication Data
US 2020/0322307 A1    Oct. 8, 2020

Related U.S. Application Data

(60) Provisional application No. 62/828,960, filed on Apr. 3, 2019.

(51) Int. Cl.
| | |
|---|---|
| *G06Q 30/02* | (2012.01) |
| *G06Q 10/06* | (2012.01) |
| *H04L 51/234* | (2022.01) |
| *H04L 51/52* | (2022.01) |
| *H04L 51/56* | (2022.01) |

(52) U.S. Cl.
CPC ......... *H04L 51/34* (2013.01); *G06Q 30/0242* (2013.01); *H04L 51/32* (2013.01); *H04L 51/36* (2013.01)

(58) Field of Classification Search
None
See application file for complete search history.

(56) References Cited

U.S. PATENT DOCUMENTS

| | | | |
|---|---|---|---|
| 9,384,258 B1* | 7/2016 | Lee-chan | G06F 16/24578 |
| 2015/0201031 A1* | 7/2015 | James | H04L 43/0876 |
| | | | 709/224 |
| 2017/0061298 A1* | 3/2017 | Lynes | G06Q 50/01 |
| 2017/0262451 A1* | 9/2017 | Milner | G06Q 50/01 |
| 2019/0081920 A1* | 3/2019 | Robinson | H04L 67/22 |
| 2019/0213476 A1* | 7/2019 | Singh | G06N 3/08 |

* cited by examiner

Primary Examiner — Nicholas R Taylor
Assistant Examiner — Ho T Shiu
(74) Attorney, Agent, or Firm — Holland & Hart LLP

(57) ABSTRACT

A cloud platform supports a digital communication system that identifies recommended communication frequencies based on past communication data. The cloud platform may support blending of weights applied to different engagement rates. Based on the weights, the system identifies recommended frequency ranges to maximize engagement rates, including the blended engagement rate using a redistribution simulation process.

20 Claims, 14 Drawing Sheets

DATA PROCESSING FOR MULTI-OBJECTIVE COMMUNICATION ENGAGEMENT

CROSS REFERENCE

The present Application for Patent claims priority to U.S. Provisional Patent Application No. 62/828,960 by Zhang et al., entitled "Data Processing for Multi-Objective Communication Engagement," filed Apr. 3, 2019, which is assigned to the assignee hereof and expressly incorporated by reference herein.

FIELD OF TECHNOLOGY

The present disclosure relates generally to database systems and data processing, and more specifically to data processing for multi-objective communication engagement.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may further support transmission of communication messages such as emails, notifications, etc. for marketing, news, and other purposes. The cloud platform may send the messages to a number of "subscribers," such as users that have subscribed to email list, users that have downloaded a particular application, etc. There may be a target minimum number of subscribers and a target maximum number of subscribers to reach with the messages, but there may also be limitations (e.g., technical, financial, time) on the total number of messages that the platform can send out for a given time period or from a particular entity.

DETAILED DESCRIPTION

Figure 1:
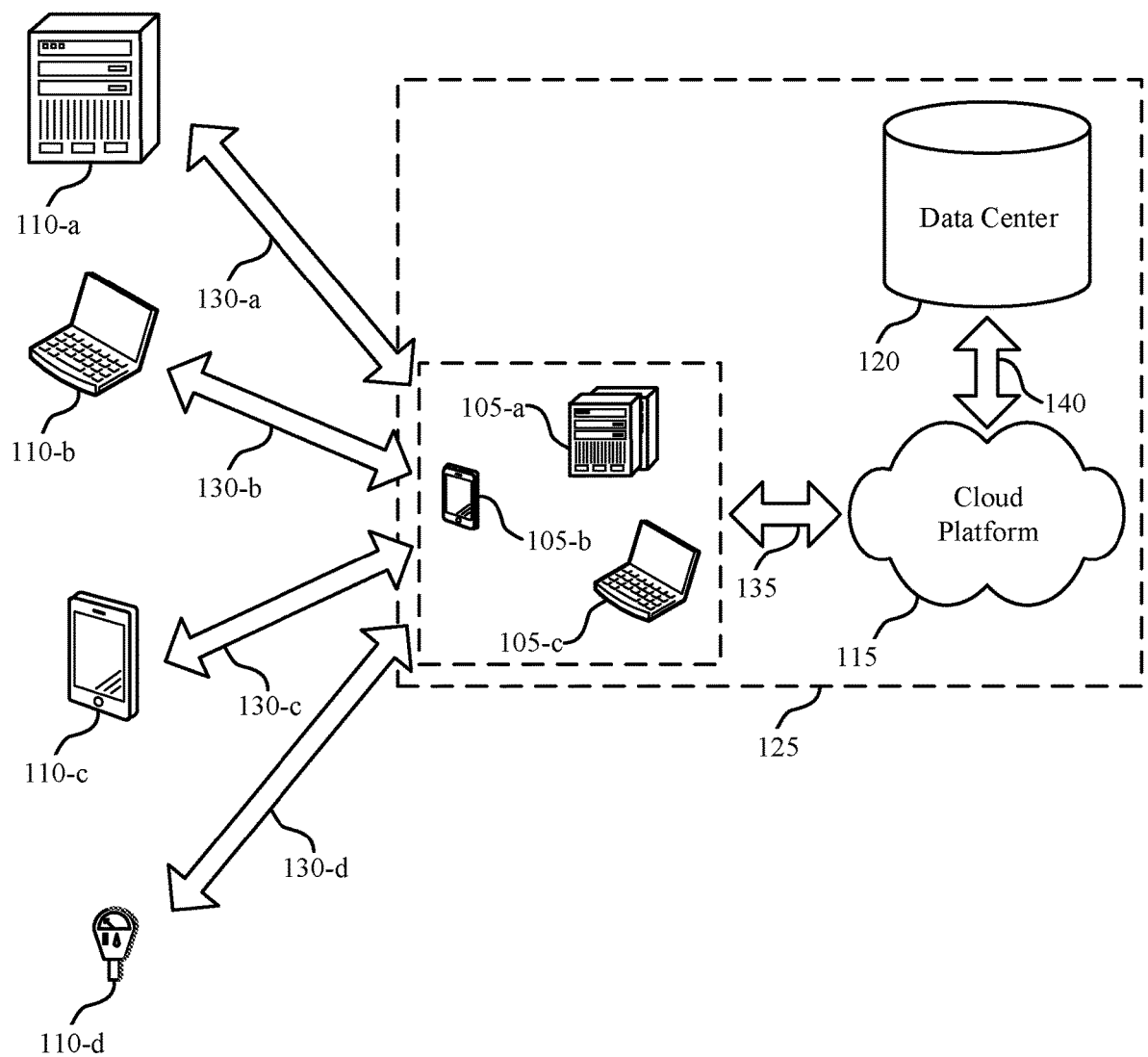
FIG. 1 illustrates an example of a system that supports data processing for multi-objective communication engagement in accordance with aspects of the present disclosure.

A system may support automated or user implemented transmission of digital communication messages to various "subscribers." Digital communication messages may include emails, push notifications, etc. Subscribers may be users that have subscribed to emails from an organization, users that have downloaded a particular application to a device, etc. In order to maximize interaction with such messages by users, the digital communication messages may be transmitted at certain times or at certain frequencies.

The implementations described herein provide a digital communication optimization system that analyzes past communication data to determine optimal frequencies to transmit subsequent digital communications. The system organizes past communications by transmission frequencies. For example, a group of users may receive a digital communication message five times, another group may receive the digital communication message four times, etc. Each transmission frequency group may have a unique set of users and may be analyzed to determine engagement rates, by for example analyzing metadata returned back to the sender of the messages. For example, the received five times group may be analyzed to determine open rate per message received, click rate per message received, unsubscribe rate per message received, etc.

To determine optimal ranges for the engagement rates, various frequency ranges are selected from the groups. For example, a range may include the received two times group to the received four times group. To determine whether this particular group is an optimal range, the system performs a distribution and calculates the net gain of engagements based on the determined rates for the groups within the range. For example, the number of messages allocated to groups outside the range (e.g., five times group and one time group) are distributed (e.g., on a pro-rata basis) to the frequency groups within the range. The ranges are checked to determine whether the redistribution of messages satisfies one or more redistribution conditions. If the conditions are satisfied, then the system determines the gains in engagements based on the previously determined engagement rates/metrics. The process is repeated for a number of ranges (e.g., in some cases, all possible ranges), and an optimal range, which may have the highest total engagements (or gain in total engagements) after the redistribution, is selected for communication frequency. Thus, the system receives metadata describing digital communications and describing whether such communications were interacted with by a user. The system then identifies optimal communication frequencies for maximizing interaction with communications by various users. In some cases, because the system identifies optimal communication frequencies, communications are thus not wasted on suboptimal frequencies. This provides for a better utilization of communication bandwidth between communication systems and user devices.

In some cases, a user may specify weights or indications of importance to engagement rate types (e.g., open rate, click rate, unsubscribe rate). In some cases, the different engagement rate types may be negatively proportional (e.g., open rate and click rate), and in some cases, the cost factor of certain engagement rates is not accounted in a data distribution. For example, in the email scenario, an unsubscribe may be very costly to an organization. As such, the organization may prefer to minimize the unsubscribe rate. However, unsubscribe rates may be underrepresented in a dataset based on the relative importance of an unsubscribe. Accordingly, aspects of the disclosure described herein provide a process for scaling important or costly metrics in a dataset. The scaling and metric blending techniques describe herein may be applicable to other communication types, such as social media posts. Using the blended approach and the redistribution techniques, the system may identify optimal ranges to maximize positive engagements and minimize negative engagements. Further, the aspects of the disclosure provide a computing resource efficient manner in determining optimal communication frequencies.

Aspects of the disclosure are initially described in the context of an environment supporting an on-demand database service. Aspects of the disclosure are further described with respect to communications systems, data analysis illustrations, and a process flow diagram. Aspects of the disclosure are further illustrated by and described with reference to apparatus diagrams, system diagrams, and flowcharts that relate to data processing for multi-objective communication engagement.

FIG. 1 illustrates an example of a system 100 for cloud computing that supports data processing for multi-objective communication engagement in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may include a digital communication system that schedules digital communications, transmits communications, analyzes communications, etc. with the cloud clients 105 and/or the contacts 110. In some cases, the digital communication system of the cloud platform 115 includes components for monitoring and/or analyzing transmitted communications. In some cases, communications over an identified time frame are analyzed to determine optimal digital communication frequencies. Accordingly, the cloud platform may provide recommendations (e.g., or automatically transmit) for optimal communication frequencies to the cloud clients 105 for communicating with the contacts 110. In other words, the cloud platform 115 may optimize the frequencies of interactions 130 with the contacts for the cloud clients 105.

Conventional communication systems may provide automatic digital communication transmission and may provide optimal times for digital communications. However, conventional systems may not automatically monitor user interaction with transmitted digital communications and optimize subsequent transmissions based on transmission frequency. These systems lead to wasted communication bandwidth on both the device and at the communication system level because users may not interact with communications that are not optimized based on frequency. Furthermore, organizations may have a limited amount of messages that the organization is able to send, thus, optimal communications that maximize user interactions is desired. Further, conventional communication optimization systems may periodically batch process communication feedback to determine engagement metrics. Batch processing communication feedback may not provide real-time communication data and optimization metrics that reflect customer goals. Further, these conventional systems do not account for the relationship between various communication metrics or the distribution of certain communication metrics in a feedback dataset. These issues may result in recommendations that are based on outdated data and do not account for specific customer problems or goals.

In contrast, the system 100 supports a digital communication system that identifies optimal digital communication frequencies based on past digital communication transmissions. The system 100 identifies frequency groups, a number of communications transmitted per frequency group, and engagement rates per frequency group based on metadata describing past digital communications. A client application supported by the system 100 may accept indications of importance of engagement rates, which may correspond to weights to engagement rates. The client application may receive communication metadata and engagement rates for past communications from a user (e.g., cloud client 105) and calculate predicted engagement rates based on the past communication engagement rates and the indicated engagement rate weights. Further, the client application may blend the indicated importance of the engagement rates to identify a blended target rate. The blended target rate accounts for each relative importance and may utilize a redistributed rate for relatively costly engagement metrics (e.g., unsubscribe rates). Accordingly, using the blended target rate, the system 100 may identify ranges communication frequencies that account for the goals of an organization (e.g., cloud client 105) while also considering costly metrics.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
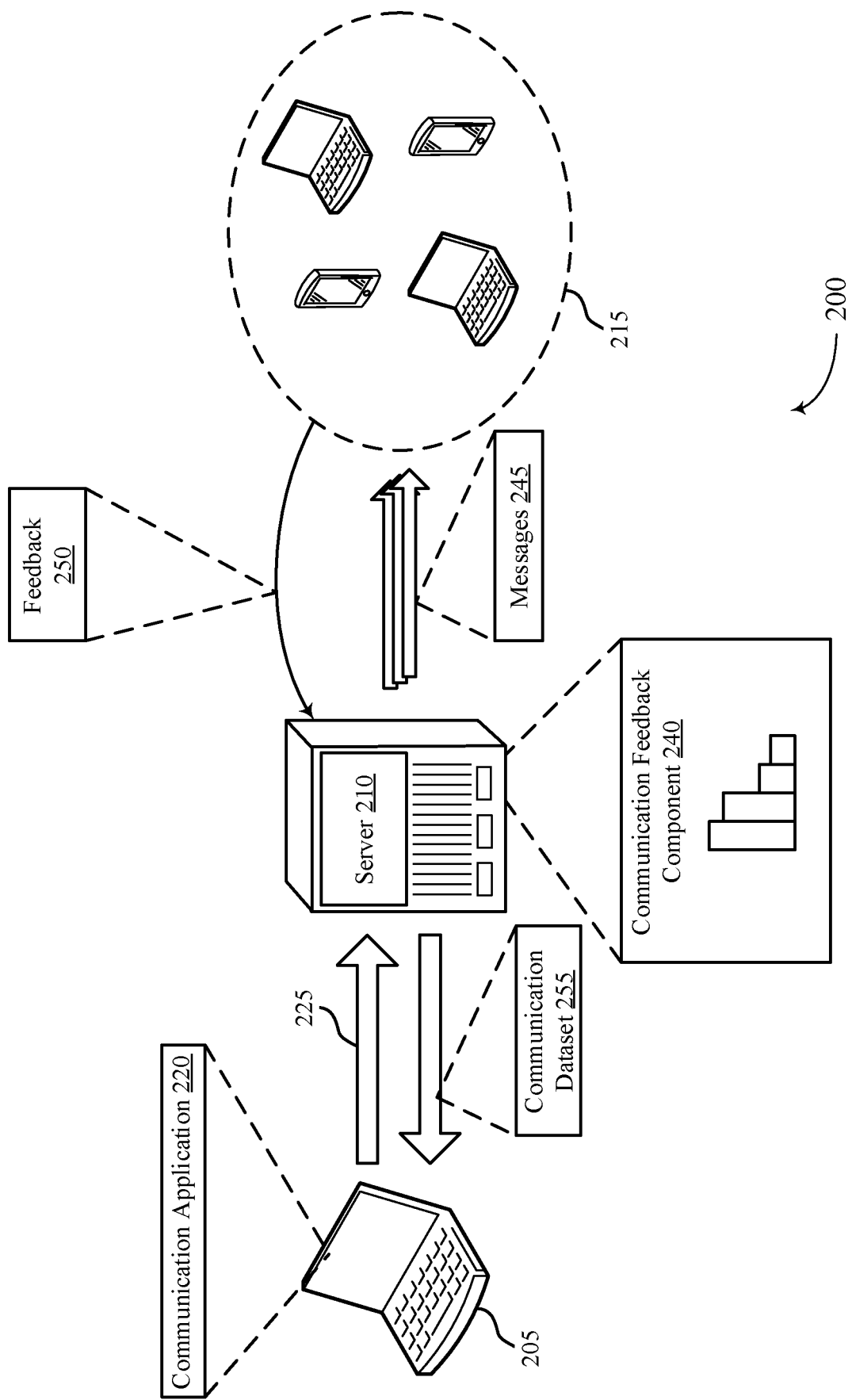
FIG. 2 illustrates an example of a communication system that supports data processing for multi-objective communication engagement in accordance with aspects of the present disclosure.

FIG. 2 illustrates an example of a communication system 200 that supports data processing for multi-objective communication engagement in accordance with aspects of the present disclosure. The system 200 includes a number of subscriber devices 215, a user device 205, and a server 210. The system 200 may implement aspects of system 100 of FIG. 1. For example, the user device 205 may be a device of a cloud client 105. The subscriber devices 210, which may be example of contacts 110 of FIG. 1, correspond to users that have subscribed to an email list, downloaded an application that receives notifications, or otherwise receive digital communications on such devices 210. Further, the server 210 may implement aspects of subsystem 125 of FIG. 1.

The server 210 may represent aspects of an application server, communication server, data processing server, etc., and transmits, receives, and/or monitors digital communications (e.g., messages 245). The server 210 executes a communication feedback component 240, which may monitor feedback 250 corresponding to transmitted messages 245. The feedback 250 may indicate whether a user opened a message 245, clicked a message (e.g., activated a link in a message), unsubscribed to the service, deleted an application associated with the message, etc. The communication feedback component 240 may organize the feedback 250 (e.g., communication metadata) into groups of frequency bins or groups (e.g., how many people received one message, two messages, three messages, etc.), and the component 240 may associate the engagement rates to each bin based on the feedback 250.

The user device 205 may execute a communication application 220, in which a user (e.g., cloud client 105) may schedule series (e.g., campaigns) of communications (e.g., emails, push notifications, etc.) to subscriber devices 215. The server 210 may transmit the messages 245 based on the scheduling and receive feedback 250 corresponding to the messages 245. The communication application 225 may further utilize communication dataset 255, which may be based on the transmitted messages 245 and corresponding feedback 250 to conduct communication frequency analysis and prediction. For example, the user may receive the communication dataset 255 from the server 210 and display predicted engagement counts or metrics based on a redistribution of users into different frequency groups. Further, the user may indicate importance (e.g., weights) for different engagement rates. The communication application 220 (or the server 210 in some cases) may blend the engagement rates based on the indicated weights and identify communication frequency ranges based on the blended weights. The identified ranges may be displayed to the user via the communication application 220.

The communication dataset 255 may include frequency groups, engagement rates for each group, and the number of users per each group. The communication application 220 may conduct analysis on the communication dataset 255 to identify optimal ranges for increasing the engagement rates. As described, the communication dataset 255 may further blend the engagement rates based on the indicated weights to identify a blended target rate, which may further correspond to the goals of the user.

Figure 3:
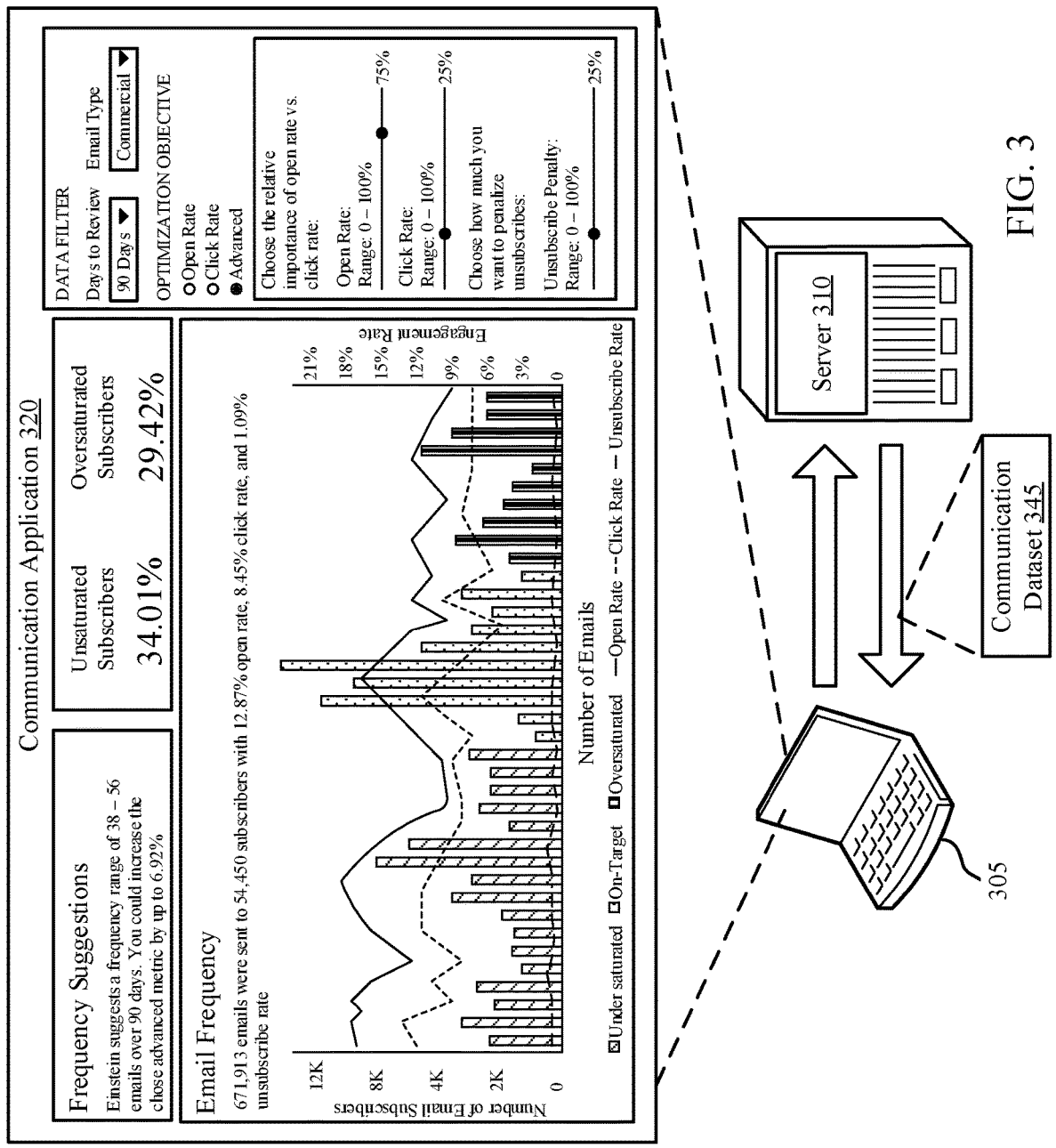
FIG. 3 illustrates an example of a communication system that supports data processing for multi-objective communication engagement in accordance with aspects of the present disclosure.

FIG. 3 illustrates an example of a communication system 300 that supports data processing for multi-objective communication engagement in accordance with aspects of the present disclosure. The communication system 300 includes a user device 305 and a server 310. The user device, which may be an example of the user device 205 of FIG. 2, executes communication application 320. The server 310, which may be an example of the server 210 of FIG. 2, may execute a communication feedback component 240 as described with respect to FIG. 2. to generate a communication dataset 345. FIG. 3 illustrates the communication application with respect to emails, but it should be understood that the implementations may be applicable to other types of communications, such as push notifications, SMS messages, etc.

The communication application 320 receives the communication dataset 345 from the server 310 in response to a request, for example. The communication application 320 may display different aspects of the communication dataset 345 including different metrics corresponding to the dataset 345. For example, the application 320 illustrates various frequencies of communications (e.g., number of emails sent) illustrated by vertical bars in the graph. The bars may be positioned by frequency from left to right. A user may filter the data by days or time period (e.g., 30, 60, or 90 days), email type (e.g., commercial, informational, etc.). The application further presents a undersaturated subscriber metric, which may indicate the percentage of subscribers that do not receive enough emails (e.g., based on an engagement metric such as open rate or click rate), and a oversaturated subscribe metric, which may indicate the percentage of subscribers that receive too many emails.

The application 320 may further calculate and display an optimal communication frequency range. The optimal range may be based on a redistribution process, as described with respect to FIG. 5. The redistribution process may utilize the known engagement rates and frequency ranges to simulate a redistribution of users outside various ranges into frequency groups within the range. Based on the redistribution and the engagement rates for groups within the grange, the application 320 may calculate a gain in engagements. Accordingly, based on the gain in engagements, the application 320 may select the range with the highest gain in engagements as an optimal range.

The application 320 may further display controls for selection of various weights or levels of importance applied to engagement rates. For example, the application 320 displays sliders corresponding to open rate and click rate. In some cases, the open rate and click may be negatively proportional. Accordingly, when a user selects a click rate using the associated slider, the open rate may be adjusted accordingly (e.g., such that the open rate and click rate percentage is not over 100%). The application 320 may further present a slider for unsubscribe penalty, in which a user may select the penalty incurred for an unsubscribe. Based on the selections using the sliders, the application 320 may generate weights that may be applied to the engagement rates for the simulation for optimal frequency range identification. Further, the application 320 may blend or combine the weights and different engagement rates such that a blended target rate is identified for each frequency group. The blended target rate may represent each engagement rate based on the selected weights, including the negative engagement rate (e.g., unsubscribe).

Using the blended target rate, the communication application 320 may simulate the redistribution to identify optimal frequency ranges for the blended target rates. Accordingly, the communication application 320 may utilize the dataset 345 to identify, in real-time or near real-time, optimal frequency ranges based on a user's preferences for different weights or importance of engagement rate types. Thus, after the selection of weights, the metrics displayed by the application 320 may represent the selected weights using the blended rate.

In some cases, the application 320 includes controls for selecting or inputting frequency ranges. Thus, rather than performing the redistribution process for each potential range, the application 320 may perform the redistribution process for one or more subset of ranges. For example, the application 320 may identify the optimal ranges between the communication frequencies of two and ten as well as for the communication frequencies of ten and fifty. In some cases, multiple subsets may overlap.

Figure 4:
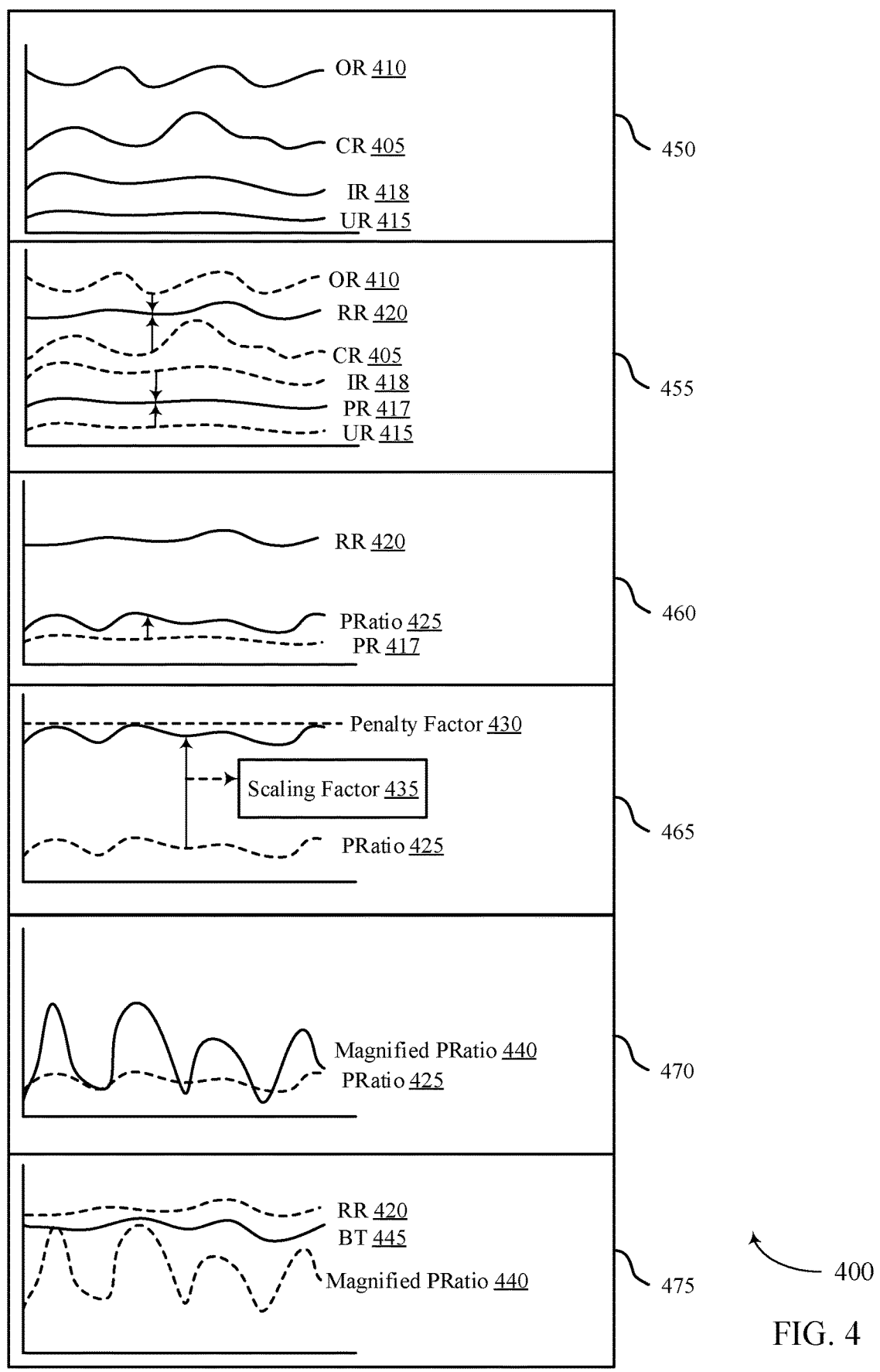
FIG. 4 illustrates an example of data analysis that supports data processing for multi-objective communication engagement in accordance with aspects of the present disclosure.

FIG. 4 illustrates an example of a data analysis process 400 that supports data processing for multi-objective communication engagement in accordance with aspects of the present disclosure. The data analysis process 400 may be conducted be various devices of FIGS. 1 through 3, including corresponding servers and user devices. Specifically, FIG. 4 illustrates the engagement rate blending process, and FIG. 4 provides a visual illustration of the data analysis process 400 with respect to a chart, with frequencies of messages sent from left to right on the x-axis and the engagement rates on the y-axis. At 450, a click rate (CR) 405, open rate (OR) 410, inactive rate (IR) 418, and unsubscribe rate (UR) 415 are illustrated on the chart. CR 405 and OR 410 may correspond to a positive engagement, while the IR 418 and UR 415 may correspond to negative engagements. The CR 405, OR 410, IR 418, and UR 415 may be based on communication data generated based on feedback corresponding to communication messages transmitted to users.

The techniques describe in FIG. 4 may be applicable to other communication types, such as social media posts. For example, an organization may post tweets at varying frequencies and times, analyze any feedback (e.g., likes, retweets, comments) to identify engagement rates relative to frequencies and times. Further, the organization may identify certain weights applicable to the feedback types, and the process described in FIG. 4 may be used to identify a blended target rate for use in determining optimal time and frequencies for posting tweets to achieve an optimal interaction. In such an example, a reply may be viewed as a negative feedback type, and likes and retweets may be viewed as a positive feedback type. Further, the techniques described in FIG. 4 may be used to identify other metrics, such as testing copy (e.g., subject lines, images, content, etc. included in emails). Based on feedback relative to transmitted emails, feedback metrics may be associated with certain versions of copy (e.g., subject line A and subject line B). Using the techniques described in herein, weights associated with feedback types may be associated with each different type of copy, and the blending of metrics may be used to identify optimally performing copy or a mixture of copies for a batch of emails.

At 455, a blended reward rate (RR) 420 is generated based on the CR 405 and the OR 410. It should be understood that other or additional positive rates may be utilized in the illustrated process. A function (F), which may be a linear function, may be utilized to identify the RR 420 based on received weights (e.g., received via sliders illustrated in FIG. 3). The RR 420 may be identified for each frequency group (e.g., each communication frequency from left to right on the x-axis). In some cases, a RR 420 may be calculated with (F)=w*OR+(1-w)*CR, where OR=open rate, CR=click rate, and w is the weight or open rate. Accordingly, the RR 420 represents the positive engagements (CR 405 and OR 410) with the indicated weights. Further at 455, a penalty rate (PR) 417 is calculated using the negative engagement rates (e.g., the IR 418 and UR 415) and associated weight. In the illustrated example, unsubscribe rate 415 and IR 418 is the negative engagement rate, but it should be understood that the process may be utilized with additional negative engagement rates or with one negative engagement rate (e.g., UR 415). For example, for each frequency bin or group, (F)=UR*w, where w is the weight indicated by the user, and UR is the respective unsubscribe rate for each frequency bin or group. Further, the process may also be utilized with one or more than two positive engagement rates. In the case of one positive or one negative engagement rate, the operation of blending to a RR 420 or PR 417 or may be skipped.

At 460, a penalty ratio (PRatio 425) is calculated, for each frequency bin, using the ratio of the RR 420 and the PR 417 (e.g., PR/RR). At 465, the PRatio 425 is shifted, such that the maximum ratio value does not exceed a maximum penalty factor 430, which may be based on the user identified weight. For example, the penalty factor 430 may correspond to the user input unsubscribe penalty, negative penalty, etc. The amount of shift results in a scaling factor 435. At 470, the scaling factor 435 is applied to the PRatio 425 to generate a magnified PRatio 440. At 475, the blended target (BT) 445 is generated based on the PRatio 425, the RR 420, and the magnified PRatio 440. For example, the BT 445 may be generated by subtracting the distribution of the RR 420 by multiplication of the magnified PRatio 440 and the PR 417. Accordingly, the BT 445 represents the blended goals by maximizing open rate and click rate according to weight, while minimizing the unsubscribe rate according to the weight.

Figure 5:
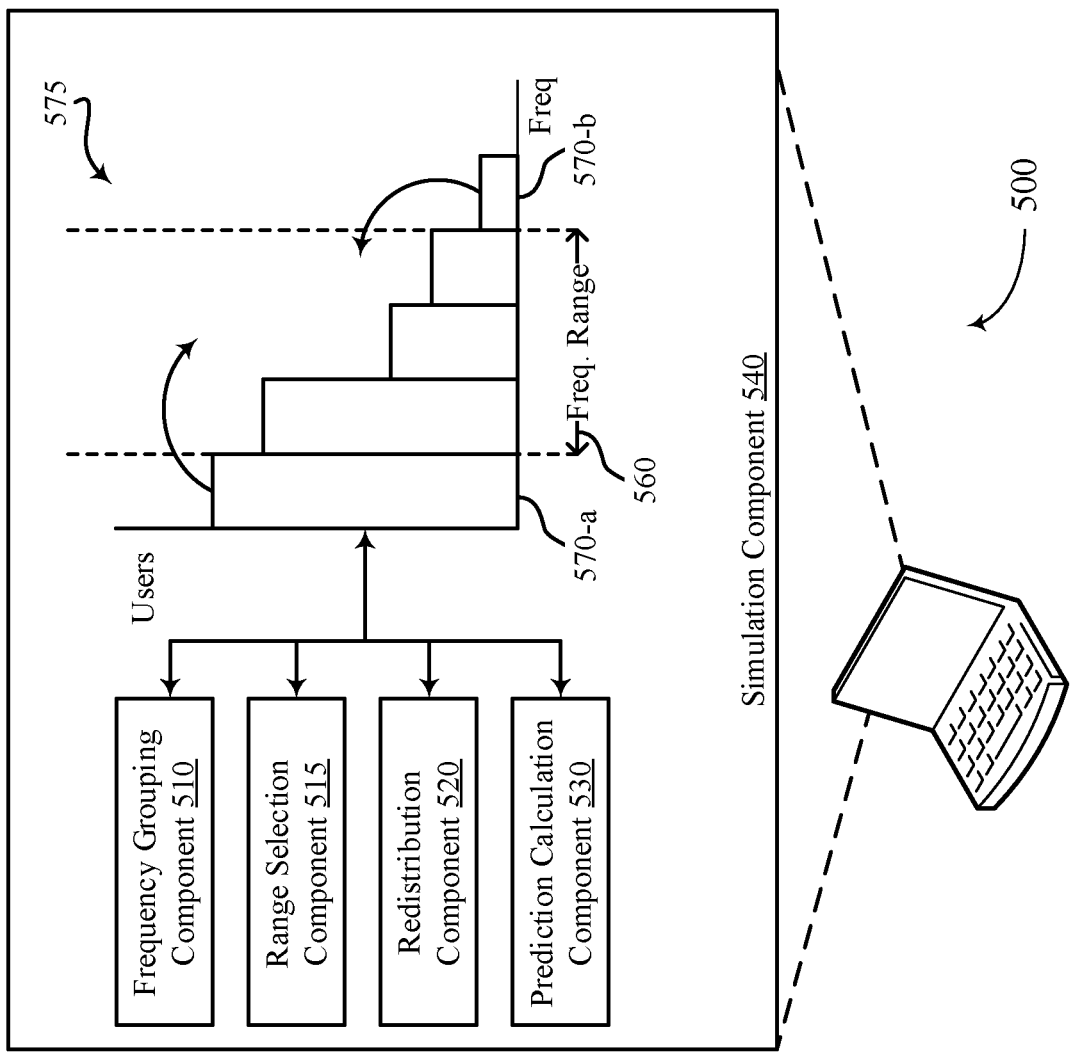
FIG. 5 illustrates an example of data analysis that supports data processing for multi-objective communication engagement in accordance with aspects of the present disclosure.

FIG. 5 illustrates a device 500 that supports data processing for multi-objective communication engagement in accordance with aspects of the present disclosure. The device 500 may be an example of a user device (e.g., user device 205 or 305). The user device executes a simulation component 540, which may be implemented as part of a communication application (e.g., communication application 220 or 320). In some cases, aspects of the simulation component 540 may be implemented by a server (e.g., server 210 or 310). The simulation component 540 may utilize a set of communication data to simulate redistributions to identify optimal frequency ranges.

A frequency grouping component 510 and groups the user engagement metadata based on a number of factors. In an implementation for emails, the user engagement metadata 502 includes send data and engagement data (e.g., open, click, and unsubscribe). The send data may be analyzed by the frequency grouping component 510 to identify enterprise ID, business unit ID, job ID, email list ID, batch ID, transaction time, subscriber ID, etc. In some cases, the frequency grouping component 510 determines whether an event is the first unique action for an email, where an email has a unique combination of the metadata including policy ID, enterprise ID, etc. The email data is injected and parsed to identify email data within relevant time frames (e.g., 50, 60, 90 days). The send data and the engagement data are combined such that the engagement data is relevant to the different business units, event type, email type, time frame, etc. The number of subscriber emails are counted such that the number of subscribers doing the engagement activity per email sent to a subscriber is identified.

The simulation component 540 identifies a set of transmission frequency groups (e.g., transmission frequency groups 570), a number of digital communication messages corresponding to each frequency group, and one or more engagement rates for each group of the set of transmission frequency groups based on the received and/or organized data. The number of digital communication messages in a frequency group may be determined based on the number of users/subscribers in a group (e.g., the number of users that received a message x times)*the frequency (e.g., x). For example, if the received a message five times group has 50 users, then the total number of messages in the group is 50*5=250 digital communication messages. A frequency chart 575 illustrates frequency groups 570 and the number of users per frequency group 570. The engagement rates for a frequency range may be determined by the number of users in a frequency group that engage with digital communication messages (e.g., opened, clicked, unsubscribed, deleted) divided by the total number of messages in the frequency group.

The frequency grouping component 510 may also normalize the data by smoothing the data based on a moving average. For example, the number of emails per frequency group may be smoothed. In some cases, the engagement rates for reach group are smoothed by the frequency grouping component 510. In smoothing the data, the engagement rate and/or number of communication messages for at least one frequency group may be adjusted.

A range selection component 515 of the communication frequency optimization component selects a plurality of frequency ranges from the frequency groups 570. All possible frequency ranges may be selected as the plurality of ranges, or the ranges may be selected on a range limiting basis. In some cases, the ranges are selected according to a user input. An example frequency range 560 is illustrated in the frequency chart 575. For each selected frequency range, a redistribution component 520 redistributes messages from frequency groups outside the range to groups within the range on a pro-rata basis. For example, in the frequency chart 575, the messages from the frequency groups 570-*a* and 570-*b* are distributed to the frequency groups within the frequency range 560-*b* (as illustrated by arrows). Furthermore, during redistribution, the redistribution component 520 determines whether the frequency range satisfies relevant thresholds. For example, the redistribution component 520 determines whether the number of users to receive the redistributed messages plus the original number of users within the range is below the total number of addressable users. The total number of addressable users may be based on the total number of subscribers from all frequency groups. If the range contains one frequency group that receives six emails and if the total number of messages is 2400 in that group (2000 original messages in the group+ 400 redistributed messages received), then the total number of users needed is 400 (2400/6) in this group. If the total addressable market is 550, which is the total number of users from frequency group 6 and the other groups outside this range before the redistribution, then the range does not satisfy the total number of addressable users threshold. Similarly, the, redistribution component 520 may consider a minimum number of users threshold. The minimum number of users threshold may be based on a number of users that a market wishes to target, for example. In some cases, the range selection component may consider the number of messages that the communication component is able to send (e.g., a budget based on price).

During redistribution, the prediction calculation component 530 determines, for each frequency range (with redistributions) a predicted total number of subscribers conducting the engagement activity based on the previously determined engagement rates for the frequency groups within the frequency range and using the number of additional messages added to each group. For example, if three groups (group 4, group 5, and group 6) are to receive 1000 redistributed emails and the groups have 100, 200, and 200 emails, respectively, then group 4 receives 200 emails, group 5 receives 400 emails, and group 6 receives 400 emails (e.g., pro-rata) provided the thresholds are satisfied. The predicted engagement rate may be calculated as:

(200*engagement rate for group 4)+(400*engagement rate for group 5)+(400*engagement rate for group 6)

Accordingly, the predicted total number of subscribers conducting the engagement activity is calculated for each frequency range. The range with the best or highest engagement rate (or lowest for unsubscribes) may be selected as the optimal range and recommended to a user. The prediction calculation component 530 may calculate different engagement metrics including the subscribers that open or click messages, number of subscribers that unsubscribe to email lists or delete applications, etc. for a number of time frames, and the metrics may be calculated periodically (e.g., every day). Thus, recommended ranges may be identified periodically or the data transmitted to user devices for range recommendation. In some cases, rather than calculating for each individual engagement rate, the system performs the redistribution using a calculated blended target rate based on weights, as described with respect to FIG. 4.

In some cases, the simulation component 540 identifies an optimal "unsubscribe" range using the methodology described herein. It should be understood that the unsubscribe range refers to range that controls or limits unsubscribes to email lists, deletion of applications, disablement of notifications, etc. In some cases, the simulation component 540 identifies the unsubscribe range by iterating through the frequency groups of past communication data from 1 to n, calculating a rolling sum of unsubscribes in the groups, and identifying a frequency group where the rolling sum reaches a threshold level of unsubscribes (e.g., 80% of the total unsubscribes). The frequency group where the threshold level of unsubscribes is reached may be selected as the center (n) of the optimal unsubscribe range, and the range may be selected as n−2 groups and n+2 groups. In FIG. 5, the prediction calculation component 530 may start with group 570-a (group with lowest frequency) and determine unsubscribes based on the number of un-subscribers obtained from the event data, move to the next frequency group and add the unsubscribes from this group to the previous number of unsubscribes, etc. When the total number of unsubscribes reaches a threshold (e.g., 80% of total unsubscribes for the dataset), then the current frequency group is selected as a center (e.g., n) of the recommended range, which may include the center−2 and the center+2. Accordingly, the communication optimization component 240 recommends not sending digital communication messages to users at a frequency greater than the upper bound of the range (n−2 to n+2) to minimize unsubscribes, deletions, or disabling of notifications.

In the case of a blended engagement rate generated using the process of FIG. 4, the blended engagement rate may be utilized at the engagement rate to determine the optimal frequency. Thus, the redistribution component 520 redistributes users (accounting for maximum and minimum thresholds), and calculates the gain in the blended engagement to identify the optimal blended engagement rate range based on the maximum gain in predicted blended engagements.

Figure 6:
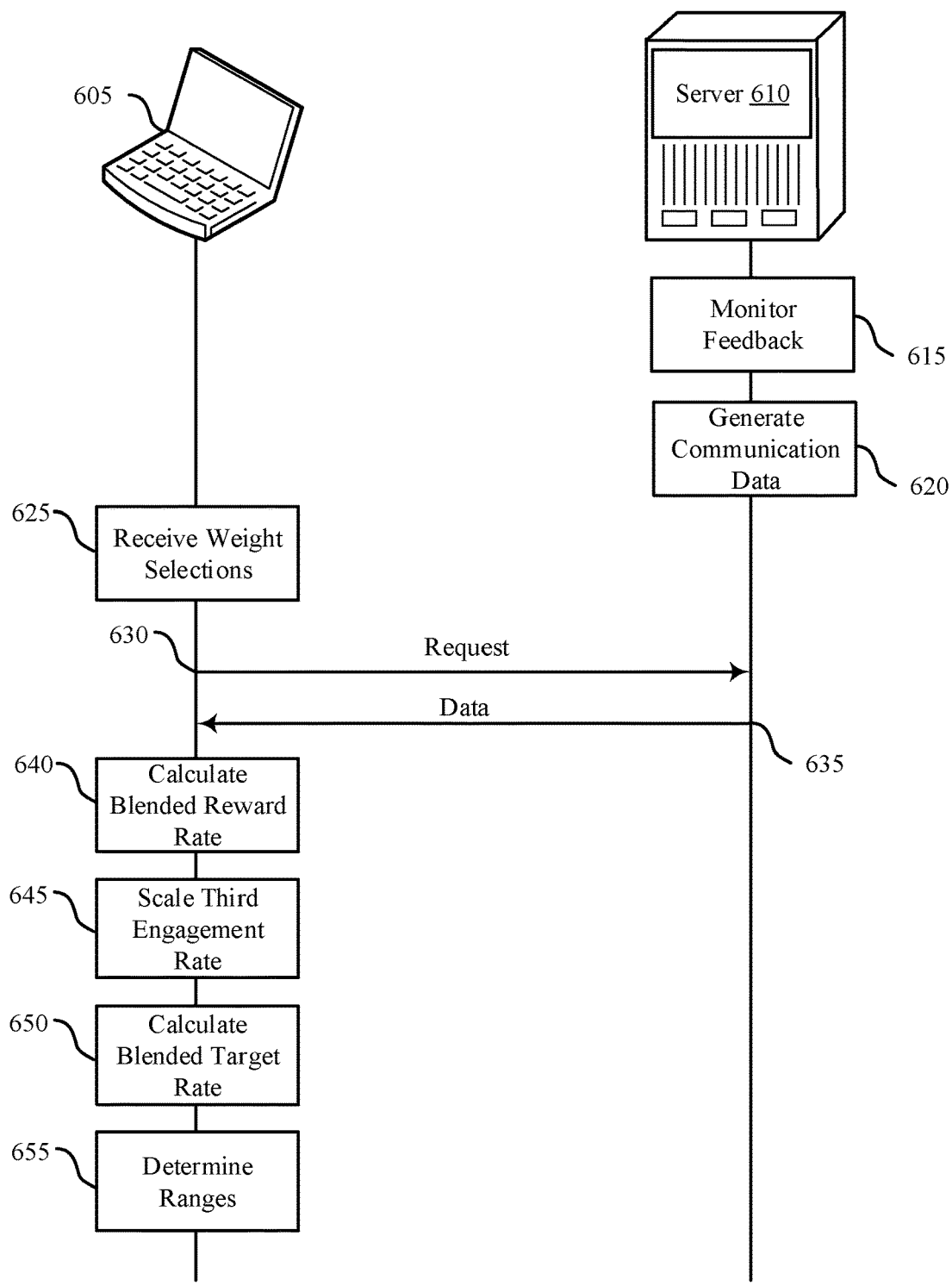
FIG. 6 illustrates an example of process flow that supports data processing for multi-objective communication engagement in accordance with aspects of the present disclosure.

FIG. 6 illustrates an example of a process flow 600 that supports data processing for multi-objective communication engagement in accordance with aspects of the present disclosure. The process flow 600 includes a user device 605 and a server 610, which may be examples of the corresponding user devices and servers of FIGS. 1 through 5.

At 615, server 610 may monitor feedback corresponding to a plurality of digital communication messages. The feedback may be based on communication metadata collected in association with the transmitted messages. At 620, the server 620 generates a communication dataset. The server 620 may generate the dataset on a periodic, semi-periodic, or continuous basis. For example, the server may update the dataset based on receipt of new feedback or on a periodic basis, such as every week, every day, every 3 hours, etc.

At 625, the user device 605 (e.g., a client system) receives a selection of weights applied to various engagement rates. In some cases, the client system receives a selection of a first weight corresponding to a first engagement rate and a second weight corresponding to a second engagement rate, and a third weight corresponding to a third engagement rate, where the first and second engagement rate correspond to positive engagement rates and where the third engagement rate corresponds to a negative engagement rate. The weights may be selected via a user interface supported by a communication application. In some cases, the selections are entered via sliders or other user activatable controls. In some cases, the client system receives a selection of a range for communication optimization. At 630, the user device 605 transmits a data request to the server 610. The data request may indicate a specific dataset, a time period for a dataset, a transmission frequency range, etc. In some cases, the request is transmitted automatically by the application.

At 635, the user device receives the dataset from the server. The dataset may include a set of transmission frequency groups for a plurality of digital communications, a number of users corresponding to each transmission frequency group of the set of transmission frequency groups, and the first engagement rate, the second engagement rate, and the third engagement rate for each transmission frequency group of the set of transmission frequency groups. The first engagement rate, the second engagement rate, and the third engagement rate may be based at least in part on user engagement metadata corresponding to the plurality of digital communications processed by the server. The set of frequency groups may be based at least in part on a range selected by a user at the user device 605.

At 640, the user device 605 calculates a blended reward rate for each frequency group based on the first weight, the first engagement rate, the second weight, and the second engagement rate for each frequency group. The blended reward rate may be calculated using a weighted average applied to the first and second engagement rates. In some cases, the blended reward may be calculated based using more than two engagement rates with corresponding weights.

At 645, the user device 605 scales, for each frequency group, the third engagement rate to generate a magnified penalty ratio for each frequency group based at least in part on the third weight. In some cases, the third engagement rate comprises a weighted average of two or more negative engagement rates. In other words, the third engagement rate may be a blended penalty rate calculated as was the blended reward rate but using negative engagement rates. In some cases, the third engagement rate (or blended penalty rate) is scaled based on a scaling factor. The scaling factor may be determined by calculating, for each frequency group, a penalty ratio between the blended reward rate and the third engagement rate (or blended penalty weight) and calculating, the scaling factor by shifting the penalty ratio for each frequency group based on the third weight to generate a shifted engagement rate ratio. The scaling factor may be applied to the penalty ratio to generate the magnified penalty ratio.

At 650, the user device 605 calculates a blended target rate based on the blended reward rate and the magnified penalty ratio for each frequency group. The blended target rate may represent the user's selected weights applied to the selected engagement metrics.

At 655, the user device 605 determines optimal communication frequency ranges based on a redistribution. For example, the user device 605 may perform the redistribution process as described with respect to FIG. 5 and based on the blended target rate for the frequency groups. In some cases, the blended target rate is applied to a redistribution calculation to identify the optimal frequency range of communication for the blended target rate. In some cases, the weights may be adjusted, and the operations at 640 through 655 may be repeated on the client device to determine the optimal ranges based on the new weights. Further, the user may input one or more ranges, and the described operations may be used to identify the optimal ranges within the user selected ranges. Because the client device receives the data including the frequency groups and metrics associated with the groups, the client device may efficiently determine the ranges, without determining the metrics and communication data. Thus, adjustments to the weights may be efficiently processed to determine ranges.

Figure 7:
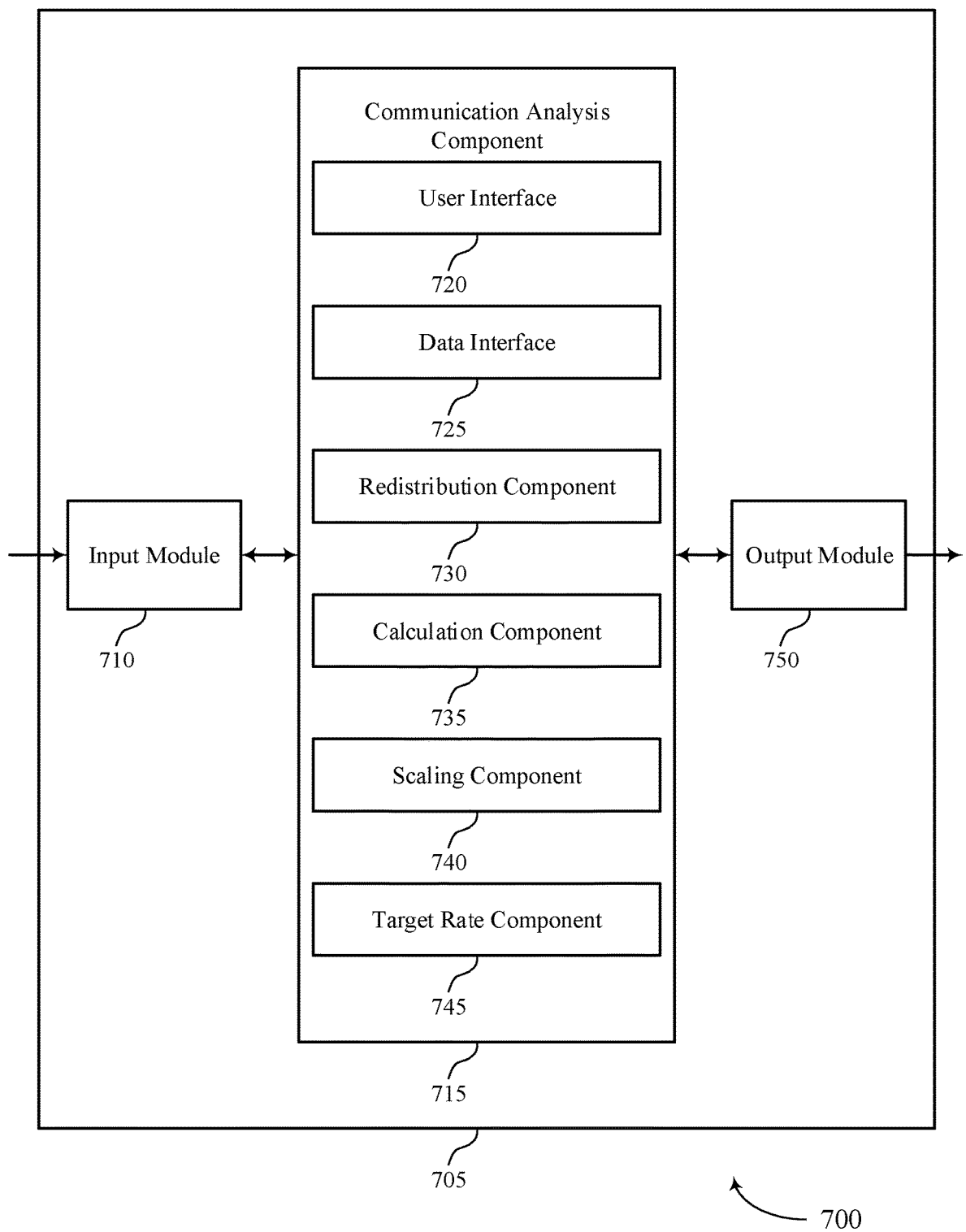
FIG. 7 shows a block diagram of an apparatus that supports data processing for multi-objective communication engagement in accordance with aspects of the present disclosure.

FIG. 7 shows a block diagram 700 of an apparatus 705 that supports data processing for multi-objective communication engagement in accordance with aspects of the present disclosure. The apparatus 705 may include an input module 710, a communication analysis component 715, and an output module 750. The apparatus 705 may also include a processor. Each of these components may be in communication with one another (e.g., via one or more buses). In some cases, the apparatus 705 may be an example of a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the communication analysis component 715 to support data processing for multi-objective communication engagement. In some cases, the input module 710 may be a component of an input/output (I/O) controller 915 as described with reference to FIG. 9.

The communication analysis component 715 may include an user interface 720, a data interface 725, a redistribution component 730, a calculation component 735, a scaling component 740, and a target rate component 745. The communication analysis component 715 may be an example of aspects of the communication analysis component 805 or 910 described with reference to FIGS. 8 and 9.

The communication analysis component 715 and/or at least some of its various sub-components may be implemented in hardware, software executed by a processor, firmware, or any combination thereof. If implemented in software executed by a processor, the functions of the communication analysis component 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communication analysis component 715 and/or at least some of its various sub-components may be physically located at various positions, including being distributed such that portions of functions are implemented at different physical locations by one or more physical devices. In some examples, the communication analysis component 715 and/or at least some of its various sub-components may be a separate and distinct component in accordance with various aspects of the present disclosure. In other examples, the communication analysis component 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The user interface 720 may receive, at a client system, a selection of a first weight corresponding to a first engagement rate and a second weight corresponding to a second engagement rate.

The data interface 725 may receive, from a database system, a set of transmission frequency groups for a set of digital communications, a number of users corresponding to each transmission frequency group of the set of transmission frequency groups, and the first engagement rate and the second engagement rate for each transmission frequency group of the set of transmission frequency groups, where the first engagement rate and the second engagement rate are based on user engagement metadata corresponding to the set of digital communications processed by the database system.

The redistribution component 730 may calculate, at the client system, for each transmission frequency group of the set of transmission frequency groups, a predicted first engagement rate and a predicted second engagement rate based on a redistribution of the number of users corresponding to each transmission frequency group and using the selected first weight corresponding the first engagement rate, the selected second weight corresponding to the second engagement rate, and the first engagement rate and the second engagement rate for each transmission frequency group.

The user interface 720 may receive, at a client system, a selection of a first weight corresponding to a first engagement rate, a selection of a second weight corresponding to a second engagement rate, and a selection of a third weight corresponding to a third engagement rate, where the first and second engagement rate correspond to positive engagement rates and where the third engagement rate corresponds to a negative engagement rate.

The data interface 725 may receive a set of transmission frequency groups for a set of digital communications, a number of users corresponding to each transmission frequency group of the set of transmission frequency groups, and the first engagement rate, the second engagement rate, and the third engagement rate for each transmission frequency group of the set of transmission frequency groups, where the first engagement rate, the second engagement rate, and the third engagement rate are based on user engagement metadata corresponding to the set of digital communications processed by a server.

The calculation component 735 may calculate a blended reward rate for each frequency group of the set of frequency groups based on the first weight, the first engagement rate, the second weight, and the second engagement rate.

The scaling component 740 may scale, for each frequency group, the third engagement rate to generate a magnified penalty ratio for each frequency group based on the third weight. The target rate component 745 may calculate, for each frequency group, a blended target rate based on the blended reward rate and the magnified third engagement rate for each frequency group.

The output module 750 may manage output signals for the apparatus 705. For example, the output module 750 may receive signals from other components of the apparatus 705, such as the communication analysis component 715, and may transmit these signals to other components or devices. In some specific examples, the output module 750 may transmit output signals for display in a user interface, for storage in a database or data store, for further processing at a server or server cluster, or for any other processes at any number of devices or systems. In some cases, the output module 750 may be a component of an I/O controller 915 as described with reference to FIG. 9.

Figure 8:
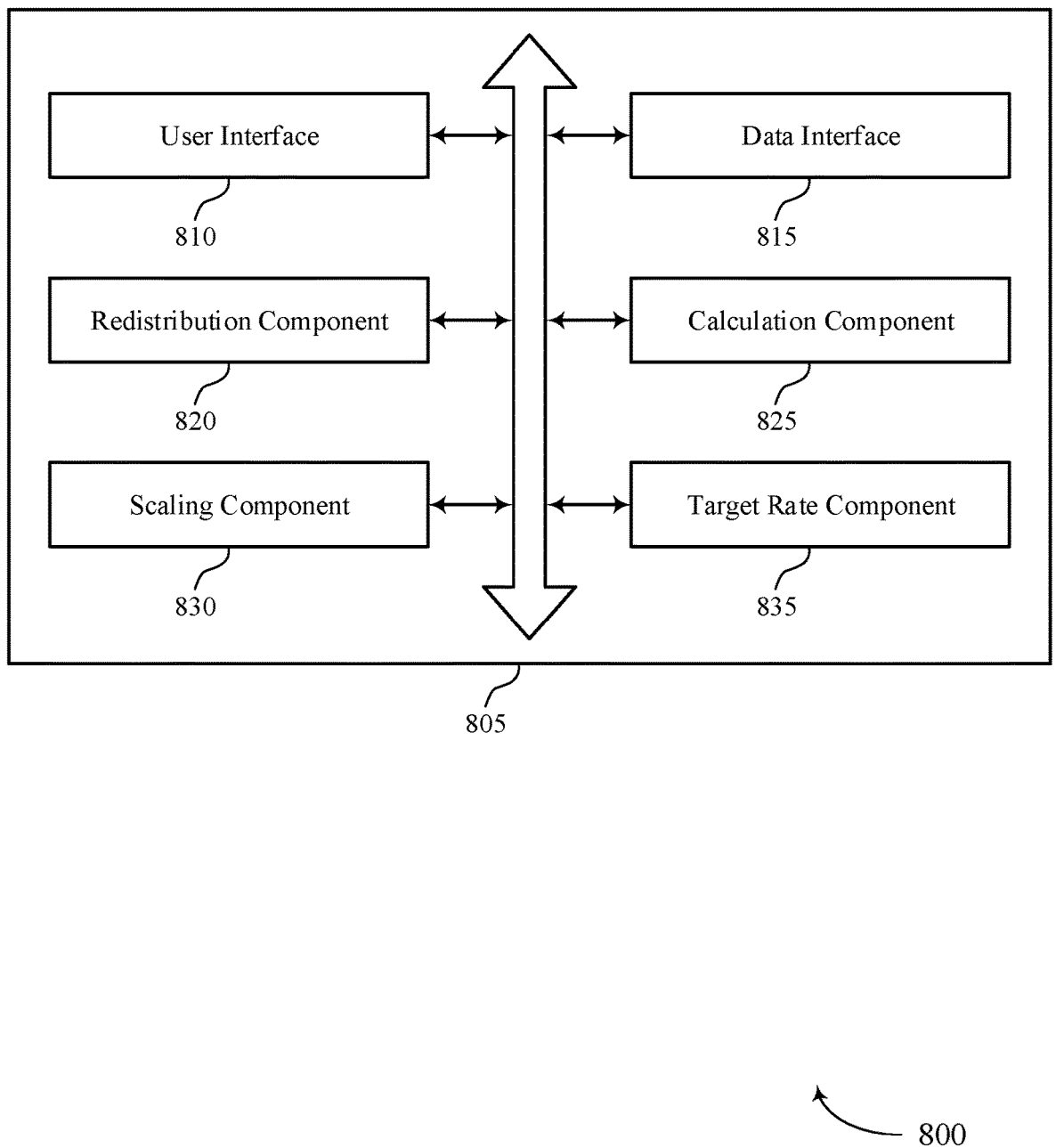
FIG. 8 shows a block diagram of a communication analysis component that supports data processing for multi-objective communication engagement in accordance with aspects of the present disclosure.

FIG. 8 shows a block diagram 800 of a communication analysis component 805 that supports data processing for multi-objective communication engagement in accordance with aspects of the present disclosure. The communication analysis component 805 may be an example of aspects of a communication analysis component 715 or a communication analysis component 910 described herein. The communication analysis component 805 may include an user interface 810, a data interface 815, a redistribution component 820, a calculation component 825, a scaling component 830, and a target rate component 835. Each of these modules may communicate, directly or indirectly, with one another (e.g., via one or more buses).

The user interface 810 may receive, at a client system, a selection of a first weight corresponding to a first engagement rate and a second weight corresponding to a second engagement rate. In some examples, the user interface 810 may receive, at a client system, a selection of a first weight corresponding to a first engagement rate, a selection of a second weight corresponding to a second engagement rate, and a selection of a third weight corresponding to a third engagement rate, where the first and second engagement rate correspond to positive engagement rates and where the third engagement rate corresponds to a negative engagement rate.

In some examples, the user interface 810 may receive, at the client system, a selection of a third weight corresponding to a third engagement rate, where the set of transmission frequency groups further includes the third engagement rate for each transmission group of the set of transmission frequency groups. In some examples, the user interface 810 may receive a selection of a range of frequency groups, where the set of frequency groups corresponding to the selected range. In some examples, the user interface 810 may receive an adjustment of one or more of the first weight, the second weight, and the third weight.

In some cases, the third engagement rate includes a blended penalty rate including two or more negative engagement rates and corresponding weights. In some cases, the first engagement rate corresponds to an open rate and the second engagement rate corresponds to a click rate. In some cases, the third engagement rate corresponds to an unsubscribe rate.

The data interface 815 may receive, from a database system, a set of transmission frequency groups for a set of digital communications, a number of users corresponding to each transmission frequency group of the set of transmission frequency groups, and the first engagement rate and the second engagement rate for each transmission frequency group of the set of transmission frequency groups, where the first engagement rate and the second engagement rate are based on user engagement metadata corresponding to the set of digital communications processed by the database system.

In some examples, the data interface 815 may receive a set of transmission frequency groups for a set of digital communications, a number of users corresponding to each transmission frequency group of the set of transmission frequency groups, and the first engagement rate, the second engagement rate, and the third engagement rate for each transmission frequency group of the set of transmission frequency groups, where the first engagement rate, the second engagement rate, and the third engagement rate are based on user engagement metadata corresponding to the set of digital communications processed by a server.

The redistribution component 820 may calculate, at the client system, for each transmission frequency group of the set of transmission frequency groups, a predicted first engagement rate and a predicted second engagement rate based on a redistribution of the number of users corresponding to each transmission frequency group and using the selected first weight corresponding the first engagement rate, the selected second weight corresponding to the second engagement rate, and the first engagement rate and the second engagement rate for each transmission frequency group. In some examples, the redistribution component 820 may calculate, at the client system, for each transmission frequency group of the set of transmission frequency groups, a predicted third engagement rate for each transmission frequency group based on the redistribution and the scaled third engagement rate.

In some examples, the redistribution component 820 may calculate, at the client system, for each transmission frequency group of the set of transmission frequency groups, a predicted blended target number increase based on a redistribution of the number of users corresponding to each transmission frequency group based on the blended target rate for each transmission frequency group. In some examples, the redistribution component 820 may select a set of transmission frequency ranges from the set of transmission frequency groups.

In some examples, the redistribution component 820 may redistribute, for each transmission frequency range of the set of transmission frequency ranges, a number of digital communication messages from each transmission frequency group of the set of transmission frequency groups outside of the transmission frequency range to transmission frequency groups within the transmission frequency range. In some examples, the redistribution component 820 may calculate, for each transmission frequency range of the set of transmission frequency ranges, a predicted target count based on the redistributed number of digital communication messages into the transmission frequency range and the blended target rate for each transmission frequency group in the transmission frequency range.

The calculation component 825 may calculate a blended reward rate for each frequency group of the set of frequency groups based on the first weight, the first engagement rate, the second weight, and the second engagement rate. In some examples, the calculation component 825 may scale the third engagement rate for each transmission frequency group based on the first weight corresponding to the first engagement rate and the second weight corresponding to the second engagement rate.

The scaling component 830 may scale, for each frequency group, the third engagement rate to generate a magnified penalty ratio for each frequency group based on the third weight. In some examples, the scaling component 830 may calculate, for each frequency group, a penalty ratio between the blended reward rate and the third engagement rate. In some examples, the scaling component 830 may calculate, for each frequency group, a scaling factor by shifting the penalty ratio for each frequency group based on the third weight to generate a shifted engagement rate ratio. In some examples, the scaling component 830 may generate the magnified penalty ratio for each frequency group based on the scaling factor and the third engagement rate for each frequency group.

The target rate component 835 may calculate, for each frequency group, a blended target rate based on the blended reward rate and the magnified third engagement rate for each frequency group.

In some examples, the target rate component 835 may recalculate, at the client system the blended target rate based on the adjustment.

Figure 9:
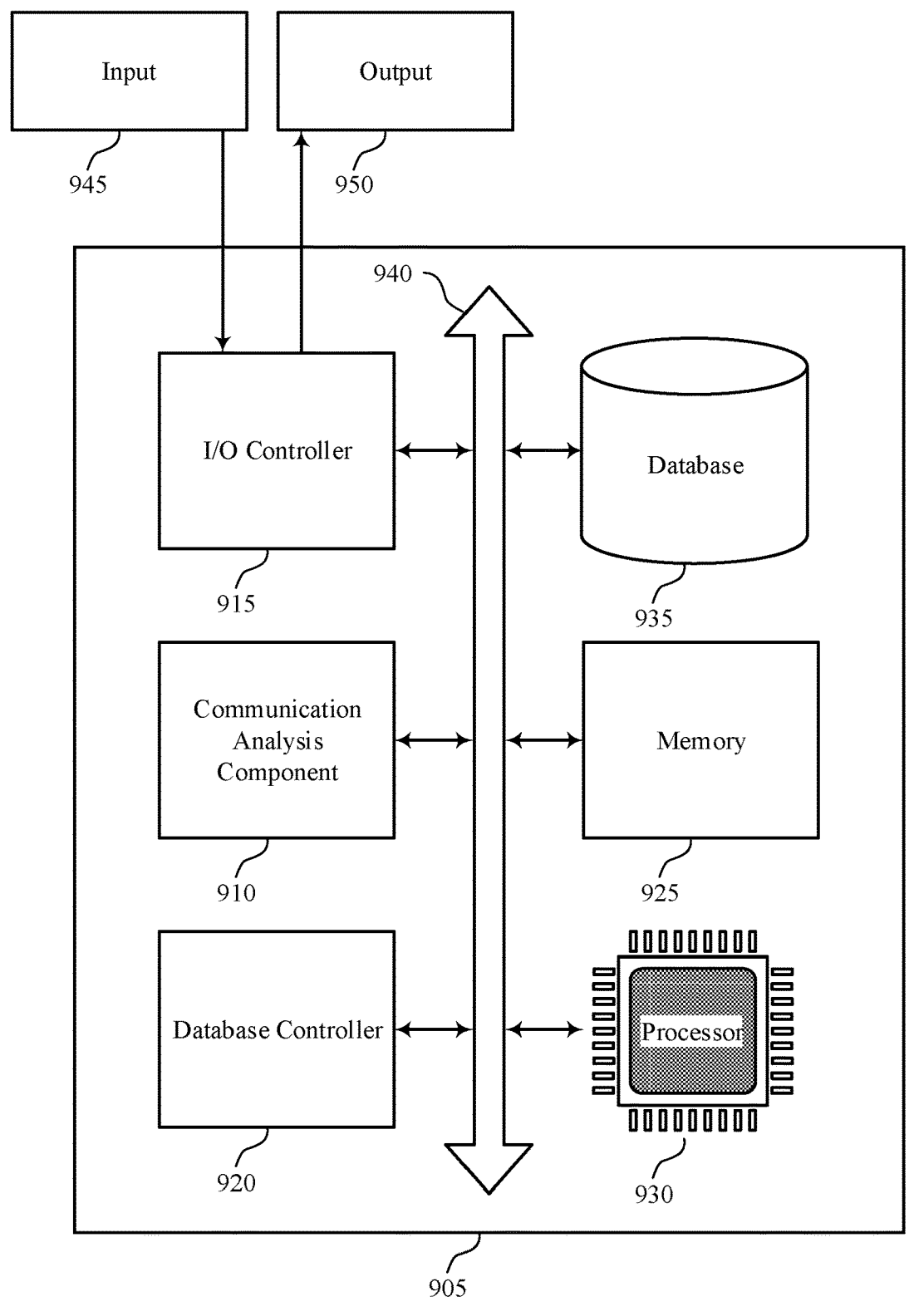
FIG. 9 shows a diagram of a system including a device that supports data processing for multi-objective communication engagement in accordance with aspects of the present disclosure.

FIG. 9 shows a diagram of a system 900 including a device 905 that supports data processing for multi-objective communication engagement in accordance with aspects of the present disclosure. The device 905 may be an example of or include the components of a user device or an apparatus 705 as described herein. The device 905 may include components for bi-directional data communications including components for transmitting and receiving communications, including a communication analysis component 910, an I/O controller 915, a database controller 920, memory 925, a processor 930, and a database 935. These components may be in electronic communication via one or more buses (e.g., bus 940).

The communication analysis component 910 may be an example of a communication analysis component 715 or 805 as described herein. For example, the communication analysis component 910 may perform any of the methods or processes described above with reference to FIGS. 7 and 8. In some cases, the communication analysis component 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

The processor 930 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting data processing for multi-objective communication engagement).

Figure 10:
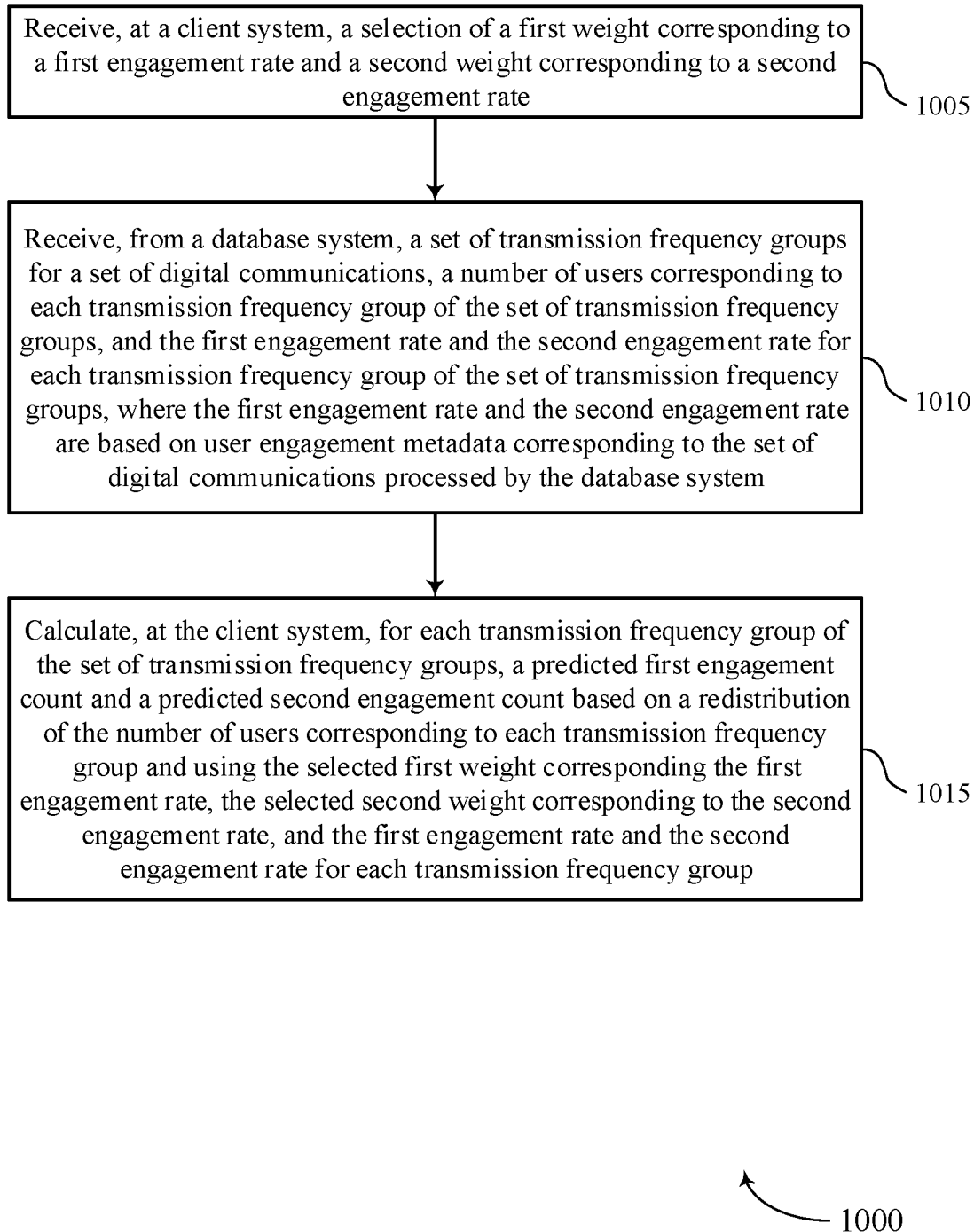
FIGS. 10 through 14 show flowcharts illustrating methods that support data processing for multi-objective communication engagement in accordance with aspects of the present disclosure.

FIG. 10 shows a flowchart illustrating a method 1000 that supports data processing for multi-objective communication engagement in accordance with aspects of the present disclosure. The operations of method 1000 may be implemented by a user device or its components as described herein. For example, the operations of method 1000 may be performed by a communication analysis component as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1005, the user device may receive, at a client system, a selection of a first weight corresponding to a first engagement rate and a second weight corresponding to a second engagement rate. The operations of 1005 may be performed according to the methods described herein. In some examples, aspects of the operations of 1005 may be performed by an user interface as described with reference to FIGS. 7 through 9.

At 1010, the user device may receive, from a database system, a set of transmission frequency groups for a set of digital communications, a number of users corresponding to each transmission frequency group of the set of transmission frequency groups, and the first engagement rate and the second engagement rate for each transmission frequency group of the set of transmission frequency groups, where the first engagement rate and the second engagement rate are based on user engagement metadata corresponding to the set of digital communications processed by the database system. The operations of 1010 may be performed according to the methods described herein. In some examples, aspects of the operations of 1010 may be performed by a data interface as described with reference to FIGS. 7 through 9.

At 1015, the user device may calculate, at the client system, for each transmission frequency group of the set of transmission frequency groups, a predicted first engagement rate and a predicted second engagement rate based on a redistribution of the number of users corresponding to each transmission frequency group and using the selected first weight corresponding the first engagement rate, the selected second weight corresponding to the second engagement rate, and the first engagement rate and the second engagement rate for each transmission frequency group. The operations of 1015 may be performed according to the methods described herein. In some examples, aspects of the operations of 1015 may be performed by a redistribution component as described with reference to FIGS. 7 through 9.

Figure 11:
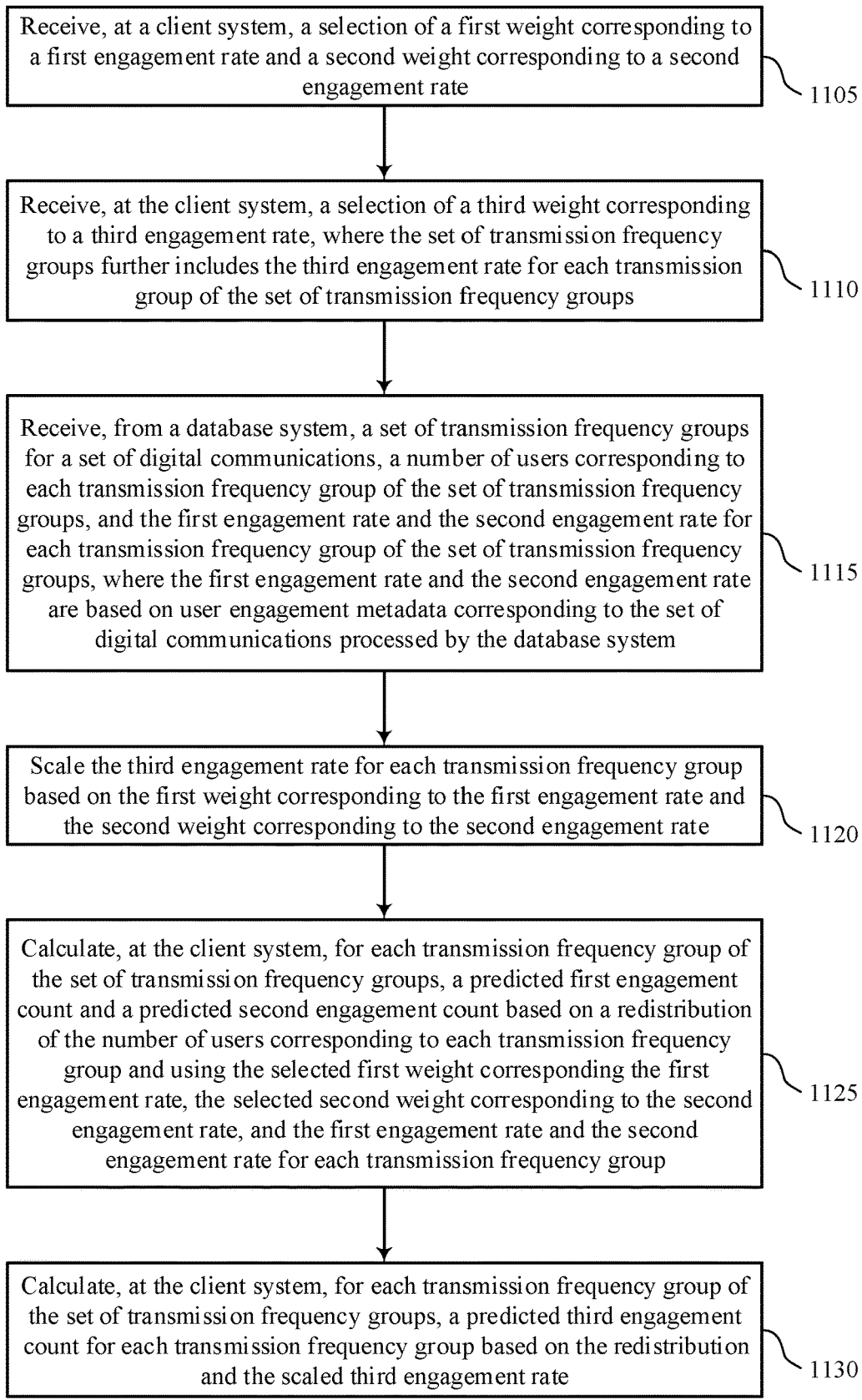

FIG. 11 shows a flowchart illustrating a method 1100 that supports data processing for multi-objective communication engagement in accordance with aspects of the present disclosure. The operations of method 1100 may be implemented by a user device or its components as described herein. For example, the operations of method 1100 may be performed by a communication analysis component as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1105, the user device may receive, at a client system, a selection of a first weight corresponding to a first engagement rate and a second weight corresponding to a second engagement rate. The operations of 1105 may be performed according to the methods described herein. In some examples, aspects of the operations of 1105 may be performed by an user interface as described with reference to FIGS. 7 through 9.

At 1110, the user device may receive, at the client system, a selection of a third weight corresponding to a third engagement rate, where the set of transmission frequency groups further includes the third engagement rate for each transmission group of the set of transmission frequency groups. The operations of 1110 may be performed according to the methods described herein. In some examples, aspects of the operations of 1110 may be performed by an user interface as described with reference to FIGS. 7 through 9.

At 1115, the user device may receive, from a database system, a set of transmission frequency groups for a set of digital communications, a number of users corresponding to each transmission frequency group of the set of transmission frequency groups, and the first engagement rate and the second engagement rate for each transmission frequency group of the set of transmission frequency groups, where the first engagement rate and the second engagement rate are based on user engagement metadata corresponding to the set of digital communications processed by the database system. The operations of 1115 may be performed according to the methods described herein. In some examples, aspects of the operations of 1115 may be performed by a data interface as described with reference to FIGS. 7 through 9.

At 1120, the user device may scale the third engagement rate for each transmission frequency group based on the first weight corresponding to the first engagement rate and the second weight corresponding to the second engagement rate. The operations of 1120 may be performed according to the methods described herein. In some examples, aspects of the operations of 1120 may be performed by a calculation component as described with reference to FIGS. 7 through 9.

At 1125, the user device may calculate, at the client system, for each transmission frequency group of the set of transmission frequency groups, a predicted first engagement rate and a predicted second engagement rate based on a redistribution of the number of users corresponding to each transmission frequency group and using the selected first weight corresponding the first engagement rate, the selected second weight corresponding to the second engagement rate, and the first engagement rate and the second engagement rate for each transmission frequency group. The operations of 1125 may be performed according to the methods described herein. In some examples, aspects of the operations of 1125 may be performed by a redistribution component as described with reference to FIGS. 7 through 9.

At 1130, the user device may calculate, at the client system, for each transmission frequency group of the set of transmission frequency groups, a predicted third engagement rate for each transmission frequency group based on the redistribution and the scaled third engagement rate. The operations of 1130 may be performed according to the methods described herein. In some examples, aspects of the operations of 1130 may be performed by a redistribution component as described with reference to FIGS. 7 through 9.

Figure 12:
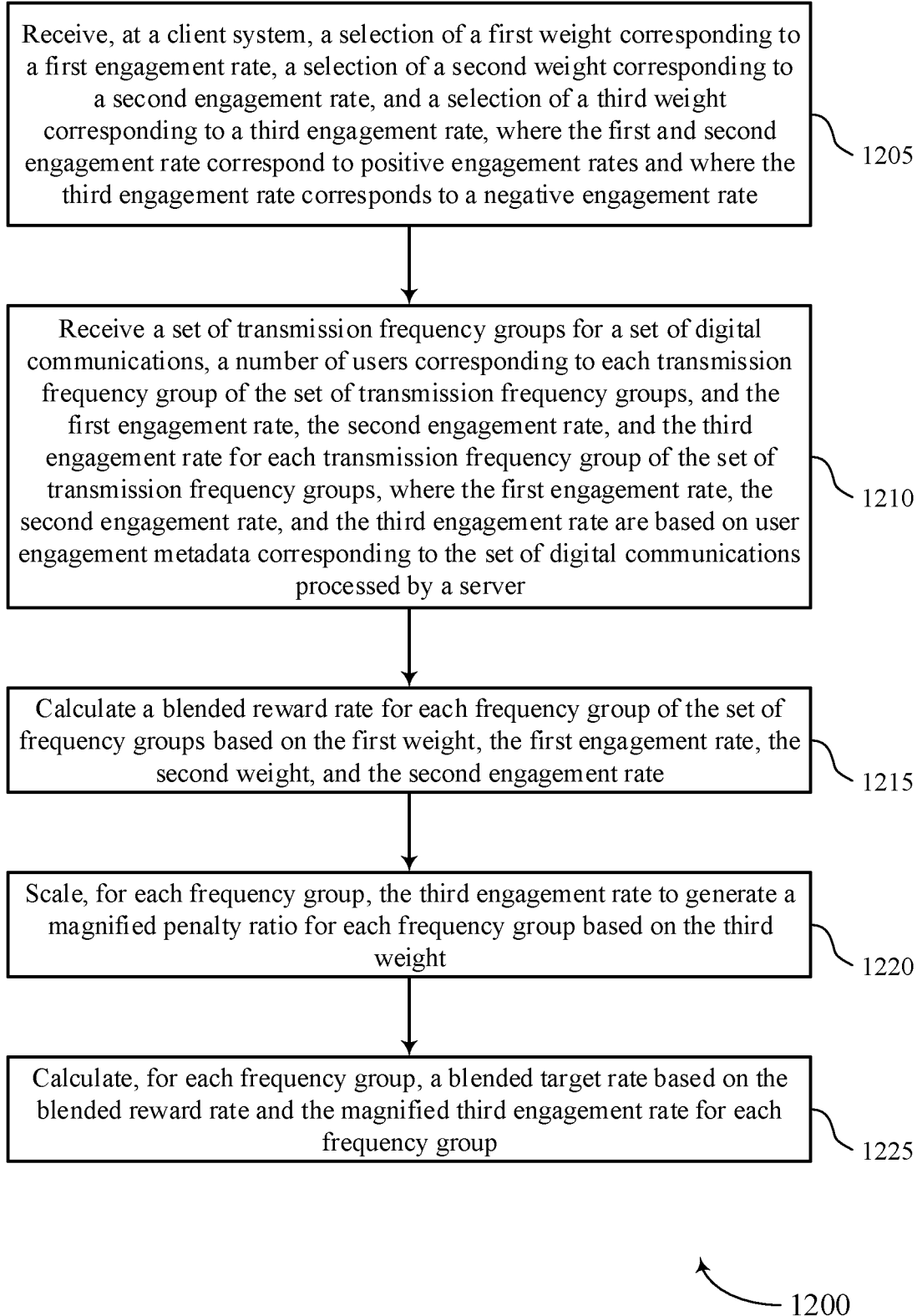

FIG. 12 shows a flowchart illustrating a method 1200 that supports data processing for multi-objective communication engagement in accordance with aspects of the present disclosure. The operations of method 1200 may be implemented by a user device or its components as described herein. For example, the operations of method 1200 may be performed by a communication analysis component as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1205, the user device may receive, at a client system, a selection of a first weight corresponding to a first engagement rate, a selection of a second weight corresponding to a second engagement rate, and a selection of a third weight corresponding to a third engagement rate, where the first and second engagement rate correspond to positive engagement rates and where the third engagement rate corresponds to a negative engagement rate. The operations of 1205 may be performed according to the methods described herein. In some examples, aspects of the operations of 1205 may be performed by an user interface as described with reference to FIGS. 7 through 9.

At 1210, the user device may receive a set of transmission frequency groups for a set of digital communications, a number of users corresponding to each transmission frequency group of the set of transmission frequency groups, and the first engagement rate, the second engagement rate, and the third engagement rate for each transmission frequency group of the set of transmission frequency groups, where the first engagement rate, the second engagement rate, and the third engagement rate are based on user engagement metadata corresponding to the set of digital communications processed by a server. The operations of 1210 may be performed according to the methods described herein. In some examples, aspects of the operations of 1210 may be performed by a data interface as described with reference to FIGS. 7 through 9.

At 1215, the user device may calculate a blended reward rate for each frequency group of the set of frequency groups based on the first weight, the first engagement rate, the second weight, and the second engagement rate. The operations of 1215 may be performed according to the methods described herein. In some examples, aspects of the operations of 1215 may be performed by a calculation component as described with reference to FIGS. 7 through 9.

At 1220, the user device may scale, for each frequency group, the third engagement rate to generate a magnified penalty ratio for each frequency group based on the third weight. The operations of 1220 may be performed according to the methods described herein. In some examples, aspects of the operations of 1220 may be performed by a scaling component as described with reference to FIGS. 7 through 9.

At 1225, the user device may calculate, for each frequency group, a blended target rate based on the blended reward rate and the magnified third engagement rate for each frequency group. The operations of 1225 may be performed according to the methods described herein. In some examples, aspects of the operations of 1225 may be performed by a target rate component as described with reference to FIGS. 7 through 9.

Figure 13:
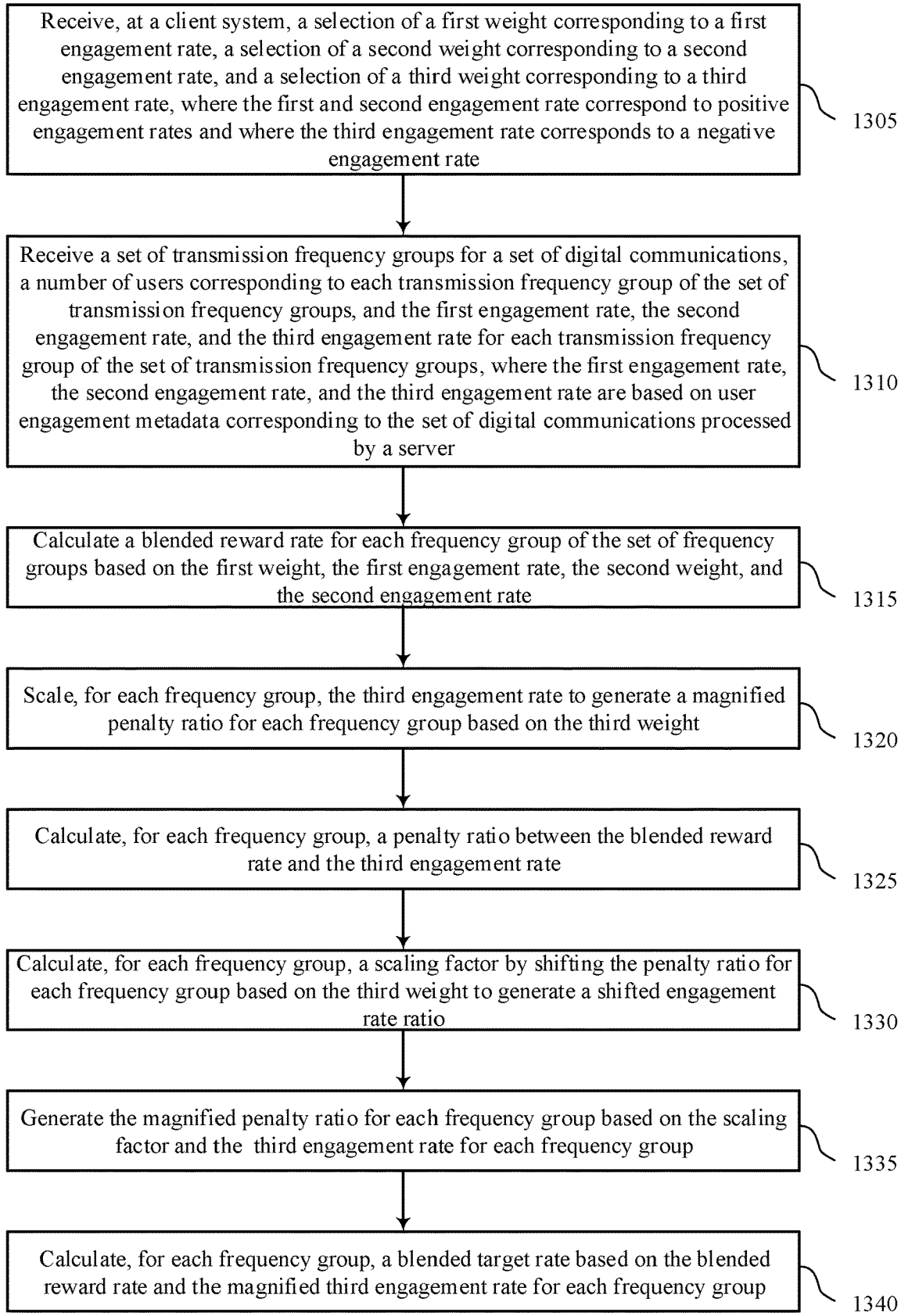

FIG. 13 shows a flowchart illustrating a method 1300 that supports data processing for multi-objective communication engagement in accordance with aspects of the present disclosure. The operations of method 1300 may be implemented by a user device or its components as described herein. For example, the operations of method 1300 may be performed by a communication analysis component as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1305, the user device may receive, at a client system, a selection of a first weight corresponding to a first engagement rate, a selection of a second weight corresponding to a second engagement rate, and a selection of a third weight corresponding to a third engagement rate, where the first and second engagement rate correspond to positive engagement rates and where the third engagement rate corresponds to a negative engagement rate. The operations of 1305 may be performed according to the methods described herein. In some examples, aspects of the operations of 1305 may be performed by an user interface as described with reference to FIGS. 7 through 9.

At 1310, the user device may receive a set of transmission frequency groups for a set of digital communications, a number of users corresponding to each transmission frequency group of the set of transmission frequency groups, and the first engagement rate, the second engagement rate, and the third engagement rate for each transmission frequency group of the set of transmission frequency groups, where the first engagement rate, the second engagement rate, and the third engagement rate are based on user engagement metadata corresponding to the set of digital communications processed by a server. The operations of 1310 may be performed according to the methods described herein. In some examples, aspects of the operations of 1310 may be performed by a data interface as described with reference to FIGS. 7 through 9.

At 1315, the user device may calculate a blended reward rate for each frequency group of the set of frequency groups based on the first weight, the first engagement rate, the second weight, and the second engagement rate. The operations of 1315 may be performed according to the methods described herein. In some examples, aspects of the operations of 1315 may be performed by a calculation component as described with reference to FIGS. 7 through 9.

At 1320, the user device may scale, for each frequency group, the third engagement rate to generate a magnified penalty ratio for each frequency group based on the third weight. The operations of 1320 may be performed according to the methods described herein. In some examples, aspects of the operations of 1320 may be performed by a scaling component as described with reference to FIGS. 7 through 9.

At 1325, the user device may calculate, for each frequency group, a penalty ratio between the blended reward rate and the third engagement rate. The operations of 1325 may be performed according to the methods described herein. In some examples, aspects of the operations of 1325 may be performed by a scaling component as described with reference to FIGS. 7 through 9.

At 1330, the user device may calculate, for each frequency group, a scaling factor by shifting the penalty ratio for each frequency group based on the third weight to generate a shifted engagement rate ratio. The operations of 1330 may be performed according to the methods described herein. In some examples, aspects of the operations of 1330 may be performed by a scaling component as described with reference to FIGS. 7 through 9.

At 1335, the user device may generate the magnified penalty ratio for each frequency group based on the scaling factor and the third engagement rate for each frequency group. The operations of 1335 may be performed according to the methods described herein. In some examples, aspects of the operations of 1335 may be performed by a scaling component as described with reference to FIGS. 7 through 9.

At 1340, the user device may calculate, for each frequency group, a blended target rate based on the blended reward rate and the magnified third engagement rate for each frequency group. The operations of 1340 may be performed according to the methods described herein. In some examples, aspects of the operations of 1340 may be performed by a target rate component as described with reference to FIGS. 7 through 9.

Figure 14:
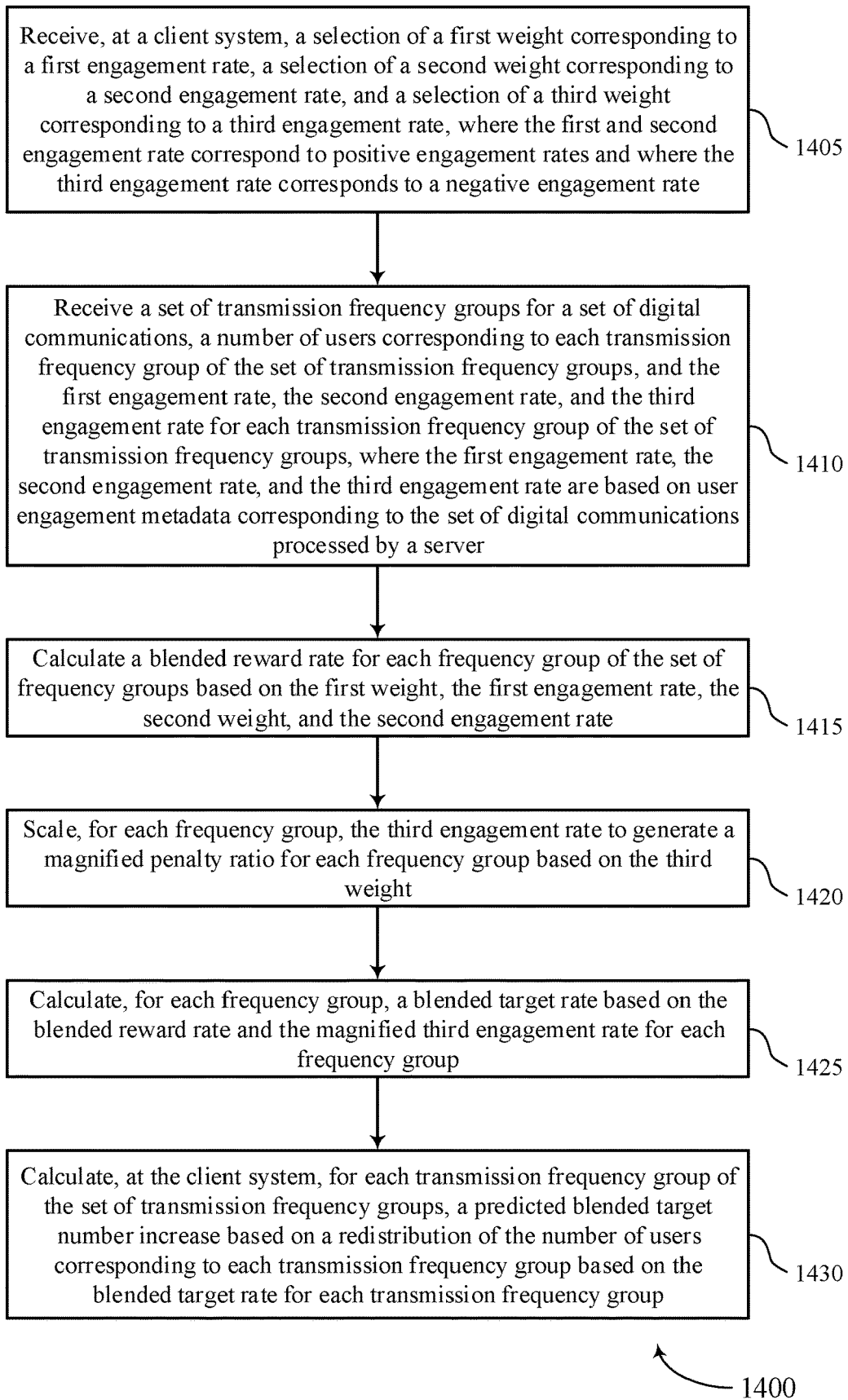

FIG. 14 shows a flowchart illustrating a method 1400 that supports data processing for multi-objective communication engagement in accordance with aspects of the present disclosure. The operations of method 1400 may be implemented by a user device or its components as described herein. For example, the operations of method 1400 may be performed by a communication analysis component as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1405, the user device may receive, at a client system, a selection of a first weight corresponding to a first engagement rate, a selection of a second weight corresponding to a second engagement rate, and a selection of a third weight corresponding to a third engagement rate, where the first and second engagement rate correspond to positive engagement rates and where the third engagement rate corresponds to a negative engagement rate. The operations of 1405 may be performed according to the methods described herein. In some examples, aspects of the operations of 1405 may be performed by an user interface as described with reference to FIGS. 7 through 9.

At 1410, the user device may receive a set of transmission frequency groups for a set of digital communications, a number of users corresponding to each transmission frequency group of the set of transmission frequency groups, and the first engagement rate, the second engagement rate, and the third engagement rate for each transmission frequency group of the set of transmission frequency groups, where the first engagement rate, the second engagement rate, and the third engagement rate are based on user engagement metadata corresponding to the set of digital communications processed by a server. The operations of 1410 may be performed according to the methods described herein. In some examples, aspects of the operations of 1410 may be performed by a data interface as described with reference to FIGS. 7 through 9.

At 1415, the user device may calculate a blended reward rate for each frequency group of the set of frequency groups based on the first weight, the first engagement rate, the second weight, and the second engagement rate. The operations of 1415 may be performed according to the methods described herein. In some examples, aspects of the operations of 1415 may be performed by a calculation component as described with reference to FIGS. 7 through 9.

At 1420, the user device may scale, for each frequency group, the third engagement rate to generate a magnified penalty ratio for each frequency group based on the third weight. The operations of 1420 may be performed according to the methods described herein. In some examples, aspects of the operations of 1420 may be performed by a scaling component as described with reference to FIGS. 7 through 9.

At 1425, the user device may calculate, for each frequency group, a blended target rate based on the blended reward rate and the magnified third engagement rate for each frequency group. The operations of 1425 may be performed according to the methods described herein. In some examples, aspects of the operations of 1425 may be performed by a target rate component as described with reference to FIGS. 7 through 9.

At 1430, the user device may calculate, at the client system, for each transmission frequency group of the set of transmission frequency groups, a predicted blended target number increase based on a redistribution of the number of users corresponding to each transmission frequency group based on the blended target rate for each transmission frequency group. The operations of 1430 may be performed according to the methods described herein. In some examples, aspects of the operations of 1430 may be performed by a redistribution component as described with reference to FIGS. 7 through 9.

A method of data processing is described. The method may include receiving, at a client system, a selection of a first weight corresponding to a first engagement rate and a second weight corresponding to a second engagement rate, receiving, from a database system, a set of transmission frequency groups for a set of digital communications, a number of users corresponding to each transmission frequency group of the set of transmission frequency groups, and the first engagement rate and the second engagement rate for each transmission frequency group of the set of transmission frequency groups, where the first engagement rate and the second engagement rate are based on user engagement metadata corresponding to the set of digital communications processed by the database system, and calculating, at the client system, for each transmission frequency group of the set of transmission frequency groups, a predicted first engagement rate and a predicted second engagement rate based on a redistribution of the number of users corresponding to each transmission frequency group and using the selected first weight corresponding the first engagement rate, the selected second weight corresponding to the second engagement rate, and the first engagement rate and the second engagement rate for each transmission frequency group.

An apparatus for data processing is described. The apparatus may include a processor, memory coupled with the processor, and instructions stored in the memory. The instructions may be executable by the processor to cause the apparatus to receive, at a client system, a selection of a first weight corresponding to a first engagement rate and a second weight corresponding to a second engagement rate, receive, from a database system, a set of transmission frequency groups for a set of digital communications, a number of users corresponding to each transmission frequency group of the set of transmission frequency groups, and the first engagement rate and the second engagement rate for each transmission frequency group of the set of transmission frequency groups, where the first engagement rate and the second engagement rate are based on user engagement metadata corresponding to the set of digital communications processed by the database system, and calculate, at the client system, for each transmission frequency group of the set of transmission frequency groups, a predicted first engagement rate and a predicted second engagement rate based on a redistribution of the number of users corresponding to each transmission frequency group and using the selected first weight corresponding the first engagement rate, the selected second weight corresponding to the second engagement rate, and the first engagement rate and the second engagement rate for each transmission frequency group.

Another apparatus for data processing is described. The apparatus may include means for receiving, at a client system, a selection of a first weight corresponding to a first engagement rate and a second weight corresponding to a second engagement rate, receiving, from a database system, a set of transmission frequency groups for a set of digital communications, a number of users corresponding to each transmission frequency group of the set of transmission frequency groups, and the first engagement rate and the second engagement rate for each transmission frequency group of the set of transmission frequency groups, where the first engagement rate and the second engagement rate are based on user engagement metadata corresponding to the set of digital communications processed by the database system, and calculating, at the client system, for each transmission frequency group of the set of transmission frequency groups, a predicted first engagement rate and a predicted second engagement rate based on a redistribution of the number of users corresponding to each transmission frequency group and using the selected first weight corresponding the first engagement rate, the selected second weight corresponding to the second engagement rate, and the first engagement rate and the second engagement rate for each transmission frequency group.

A non-transitory computer-readable medium storing code for data processing is described. The code may include instructions executable by a processor to receive, at a client system, a selection of a first weight corresponding to a first engagement rate and a second weight corresponding to a second engagement rate, receive, from a database system, a set of transmission frequency groups for a set of digital communications, a number of users corresponding to each transmission frequency group of the set of transmission frequency groups, and the first engagement rate and the second engagement rate for each transmission frequency group of the set of transmission frequency groups, where the first engagement rate and the second engagement rate are based on user engagement metadata corresponding to the set of digital communications processed by the database system, and calculate, at the client system, for each transmission frequency group of the set of transmission frequency groups, a predicted first engagement rate and a predicted second engagement rate based on a redistribution of the number of users corresponding to each transmission frequency group and using the selected first weight corresponding the first engagement rate, the selected second weight corresponding to the second engagement rate, and the first engagement rate and the second engagement rate for each transmission frequency group.

Some examples of the method, apparatuses, and non-transitory computer-readable medium described herein may further include operations, features, means, or instructions for receiving, at the client system, a selection of a third weight corresponding to a third engagement rate, where the set of transmission frequency groups further includes the third engagement rate for each transmission group of the set of transmission frequency groups, scaling the third engagement rate for each transmission frequency group based on the first weight corresponding to the first engagement rate and the second weight corresponding to the second engagement rate, and calculating, at the client system, for each transmission frequency group of the set of transmission frequency groups, a predicted third engagement rate for each transmission frequency group based on the redistribution and the scaled third engagement rate.

A method of data processing is described. The method may include receiving, at a client system, a selection of a first weight corresponding to a first engagement rate, a selection of a second weight corresponding to a second engagement rate, and a selection of a third weight corresponding to a third engagement rate, where the first and second engagement rate correspond to positive engagement rates and where the third engagement rate corresponds to a negative engagement rate, receiving a set of transmission frequency groups for a set of digital communications, a number of users corresponding to each transmission frequency group of the set of transmission frequency groups, and the first engagement rate, the second engagement rate, and the third engagement rate for each transmission frequency group of the set of transmission frequency groups, where the first engagement rate, the second engagement rate, and the third engagement rate are based on user engagement metadata corresponding to the set of digital communications processed by a server, calculating a blended reward rate for each frequency group of the set of frequency groups based on the first weight, the first engagement rate, the second weight, and the second engagement rate, scaling, for each frequency group, the third engagement rate to generate a magnified penalty ratio for each frequency group based on the third weight, and calculating, for each frequency group, a blended target rate based on the blended reward rate and the magnified third engagement rate for each frequency group.

An apparatus for data processing is described. The apparatus may include a processor, memory coupled with the processor, and instructions stored in the memory. The instructions may be executable by the processor to cause the apparatus to receive, at a client system, a selection of a first weight corresponding to a first engagement rate, a selection of a second weight corresponding to a second engagement rate, and a selection of a third weight corresponding to a third engagement rate, where the first and second engagement rate correspond to positive engagement rates and where the third engagement rate corresponds to a negative engagement rate, receive a set of transmission frequency groups for a set of digital communications, a number of users corresponding to each transmission frequency group of the set of transmission frequency groups, and the first engagement rate, the second engagement rate, and the third engagement rate for each transmission frequency group of the set of transmission frequency groups, where the first engagement rate, the second engagement rate, and the third engagement rate are based on user engagement metadata corresponding to the set of digital communications processed by a server, calculate a blended reward rate for each frequency group of the set of frequency groups based on the first weight, the first engagement rate, the second weight, and the second engagement rate, scale, for each frequency group, the third engagement rate to generate a magnified penalty ratio for each frequency group based on the third weight, and calculate, for each frequency group, a blended target rate based on the blended reward rate and the magnified third engagement rate for each frequency group.

Another apparatus for data processing is described. The apparatus may include means for receiving, at a client system, a selection of a first weight corresponding to a first engagement rate, a selection of a second weight corresponding to a second engagement rate, and a selection of a third weight corresponding to a third engagement rate, where the first and second engagement rate correspond to positive engagement rates and where the third engagement rate corresponds to a negative engagement rate, receiving a set of transmission frequency groups for a set of digital communications, a number of users corresponding to each transmission frequency group of the set of transmission frequency groups, and the first engagement rate, the second engagement rate, and the third engagement rate for each transmission frequency group of the set of transmission frequency groups, where the first engagement rate, the second engagement rate, and the third engagement rate are based on user engagement metadata corresponding to the set of digital communications processed by a server, calculating a blended reward rate for each frequency group of the set of frequency groups based on the first weight, the first engagement rate, the second weight, and the second engagement rate, scaling, for each frequency group, the third engagement rate to generate a magnified penalty ratio for each frequency group based on the third weight, and calculating, for each frequency group, a blended target rate based on the blended reward rate and the magnified third engagement rate for each frequency group.

A non-transitory computer-readable medium storing code for data processing is described. The code may include instructions executable by a processor to receive, at a client system, a selection of a first weight corresponding to a first engagement rate, a selection of a second weight corresponding to a second engagement rate, and a selection of a third weight corresponding to a third engagement rate, where the first and second engagement rate correspond to positive engagement rates and where the third engagement rate corresponds to a negative engagement rate, receive a set of transmission frequency groups for a set of digital communications, a number of users corresponding to each transmission frequency group of the set of transmission frequency groups, and the first engagement rate, the second engagement rate, and the third engagement rate for each transmission frequency group of the set of transmission frequency groups, where the first engagement rate, the second engagement rate, and the third engagement rate are based on user engagement metadata corresponding to the set of digital communications processed by a server, calculate a blended reward rate for each frequency group of the set of frequency groups based on the first weight, the first engagement rate, the second weight, and the second engagement rate, scale, for each frequency group, the third engagement rate to generate a magnified penalty ratio for each frequency group based on the third weight, and calculate, for each frequency group, a blended target rate based on the blended reward rate and the magnified third engagement rate for each frequency group.

In some examples of the method, apparatuses, and non-transitory computer-readable medium described herein, scaling the third engagement rate for each frequency group further may include operations, features, means, or instructions for calculating, for each frequency group, a penalty ratio between the blended reward rate and the third engagement rate, calculating, for each frequency group, a scaling factor by shifting the penalty ratio for each frequency group based on the third weight to generate a shifted engagement rate ratio, and generating the magnified penalty ratio for each frequency group based on the scaling factor and the third engagement rate for each frequency group.

Some examples of the method, apparatuses, and non-transitory computer-readable medium described herein may further include operations, features, means, or instructions for calculating, at the client system, for each transmission frequency group of the set of transmission frequency groups, a predicted blended target number increase based on a redistribution of the number of users corresponding to each transmission frequency group based on the blended target rate for each transmission frequency group.

In some examples of the method, apparatuses, and non-transitory computer-readable medium described herein, calculating based on the redistribution further may include operations, features, means, or instructions for selecting a set of transmission frequency ranges from the set of transmission frequency groups, redistributing, for each transmission frequency range of the set of transmission frequency ranges, a number of digital communication messages from each transmission frequency group of the set of transmission frequency groups outside of the transmission frequency range to transmission frequency groups within the transmission frequency range, and calculating, for each transmission frequency range of the set of transmission frequency ranges, a predicted target count based on the redistributed number of digital communication messages into the transmission frequency range and the blended target rate for each transmission frequency group in the transmission frequency range.

Some examples of the method, apparatuses, and non-transitory computer-readable medium described herein may further include operations, features, means, or instructions for receiving a selection of a range of frequency groups, where the set of frequency groups corresponding to the selected range.

Some examples of the method, apparatuses, and non-transitory computer-readable medium described herein may further include operations, features, means, or instructions for receiving an adjustment of one or more of the first weight, the second weight, and the third weight, and recalculating, at the client system the blended target rate based on the adjustment.

In some examples of the method, apparatuses, and non-transitory computer-readable medium described herein, the third engagement rate includes a blended penalty rate including two or more negative engagement rates and corresponding weights.

In some examples of the method, apparatuses, and non-transitory computer-readable medium described herein, the first engagement rate corresponds to an open rate and the second engagement rate corresponds to a click rate.

In some examples of the method, apparatuses, and non-transitory computer-readable medium described herein, the third engagement rate corresponds to an unsubscribe rate.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   receiving, at a client system, a selection of a first weight corresponding to a first engagement rate, a selection of a second weight corresponding to a second engagement rate, and a selection of a third weight corresponding to a third engagement rate, wherein the first engagement rate and the second engagement rate correspond to positive engagement rates and wherein the third engagement rate corresponds to a negative engagement rate;
   receiving a set of transmission frequency groups for a plurality of digital communications, a number of users corresponding to each transmission frequency group of the set of transmission frequency groups such that the number of users for a transmission frequency group have received a digital communication of the plurality of digital communications at a respective receive rate for the transmission frequency group, and the first engagement rate, the second engagement rate, and the third engagement rate for the set of transmission frequency groups, wherein the first engagement rate, the second engagement rate, and the third engagement rate are based at least in part on user engagement metadata corresponding to the plurality of digital communications processed by a server;
   calculating a blended reward rate for the transmission frequency group of the set of transmission frequency groups based on the first weight, the first engagement rate, the second weight, and the second engagement rate corresponding to the transmission frequency group;
   scaling, for the transmission frequency group, the third engagement rate to generate a magnified penalty ratio for the transmission frequency group based on the third weight; and
   calculating, for the transmission frequency group, a blended target rate based on the blended reward rate and the magnified penalty ratio for the transmission frequency group.

2. The method of claim 1, wherein scaling the third engagement rate for the transmission frequency group further comprises:
   calculating, for the transmission frequency group, a penalty ratio between the blended reward rate and the third engagement rate;
   calculating, for the transmission frequency group, a scaling factor by shifting the penalty ratio for each frequency group based on the third weight to generate a shifted engagement rate ratio; and
   generating the magnified penalty ratio for the transmission frequency group based on the scaling factor and the third engagement rate for the transmission frequency group.

3. The method of claim 1, further comprising:
   calculating, at the client system, for the transmission frequency group, a predicted blended target number increase based on a redistribution of the number of users corresponding to the transmission frequency group based on the blended target rate for the transmission frequency group.

4. The method of claim 3, wherein calculating based on the redistribution further comprises:
   selecting a plurality of transmission frequency ranges from the set of transmission frequency groups;
   redistributing, for each transmission frequency range of the plurality of transmission frequency ranges, a number of digital communication messages from each transmission frequency group of the set of transmission frequency groups outside of a transmission frequency range to transmission frequency groups within the transmission frequency range; and
   calculating, for each transmission frequency range of the plurality of transmission frequency ranges, a predicted target count based at least in part on the redistributed number of digital communication messages into the transmission frequency range and the blended target rate for each transmission frequency group in the transmission frequency range.

5. The method of claim 1, further comprising:
receiving a selection of a range of frequency groups, wherein the set of transmission frequency groups corresponds to the selected range.

6. The method of claim 1, further comprising:
receiving an adjustment of one or more of the first weight, the second weight, and the third weight; and
recalculating, at the client system the blended target rate based on the adjustment.

7. The method of claim 1, wherein the third engagement rate comprises a blended penalty rate comprising two or more negative engagement rates and corresponding weights.

8. The method of claim 1, wherein the first engagement rate corresponds to an open rate and the second engagement rate corresponds to a click rate.

9. The method of claim 1, wherein the third engagement rate corresponds to an unsubscribe rate.

10. An apparatus for data processing, comprising:
a processor,
memory coupled with the processor; and
instructions stored in the memory and executable by the processor to cause the apparatus to:
receive, at a client system, a selection of a first weight corresponding to a first engagement rate, a selection of a second weight corresponding to a second engagement rate, and a selection of a third weight corresponding to a third engagement rate, wherein the first engagement rate and the second engagement rate correspond to positive engagement rates and wherein the third engagement rate corresponds to a negative engagement rate;
receive a set of transmission frequency groups for a plurality of digital communications, a number of users corresponding to each transmission frequency group of the set of transmission frequency groups such that the number of users for a transmission frequency group have received a digital communication of the plurality of digital communications at a respective receive rate for the transmission frequency group, and the first engagement rate, the second engagement rate, and the third engagement rate for the set of transmission frequency groups, wherein the first engagement rate, the second engagement rate, and the third engagement rate are based at least in part on user engagement metadata corresponding to the plurality of digital communications processed by a server;
calculate a blended reward rate for the transmission frequency group of the set of transmission frequency groups based on the first weight, the first engagement rate, the second weight, and the second engagement rate corresponding to the transmission frequency group;
scale, for the transmission frequency group, the third engagement rate to generate a magnified penalty ratio for the transmission frequency group based on the third weight; and
calculate, for the transmission frequency group, a blended target rate based on the blended reward rate and the magnified penalty ratio for the transmission frequency group.

11. The apparatus of claim 10, wherein the instructions to scale the third engagement rate for the transmission frequency group further are executable by the processor to cause the apparatus to:
calculate, for the transmission frequency group, a penalty ratio between the blended reward rate and the third engagement rate;
calculate, for the transmission frequency group, a scaling factor by shifting the penalty ratio for each frequency group based on the third weight to generate a shifted engagement rate ratio; and
generate the magnified penalty ratio for the transmission frequency group based on the scaling factor and the third engagement rate for the transmission frequency group.

12. The apparatus of claim 10, wherein the instructions are further executable by the processor to cause the apparatus to:
calculate, at the client system, for the transmission frequency group, a predicted blended target number increase based on a redistribution of the number of users corresponding to the transmission frequency group based on the blended target rate for the transmission frequency group.

13. The apparatus of claim 12, wherein the instructions to calculate based on the redistribution further are executable by the processor to cause the apparatus to:
select a plurality of transmission frequency ranges from the set of transmission frequency groups;
redistribute, for each transmission frequency range of the plurality of transmission frequency ranges, a number of digital communication messages from each transmission frequency group of the set of transmission frequency groups outside of a transmission frequency range to transmission frequency groups within the transmission frequency range; and
calculate, for each transmission frequency range of the plurality of transmission frequency ranges, a predicted target count based at least in part on the redistributed number of digital communication messages into the transmission frequency range and the blended target rate for each transmission frequency group in the transmission frequency range.

14. The apparatus of claim 10, wherein the instructions are further executable by the processor to cause the apparatus to:
receive a selection of a range of frequency groups, wherein the set of transmission frequency groups corresponds to the selected range.

15. The apparatus of claim 10, wherein the instructions are further executable by the processor to cause the apparatus to:
receive an adjustment of one or more of the first weight, the second weight, and the third weight; and
recalculate, at the client system the blended target rate based on the adjustment.

16. A non-transitory computer-readable medium storing code for data processing, the code comprising instructions executable by a processor to:
receive, at a client system, a selection of a first weight corresponding to a first engagement rate, a selection of a second weight corresponding to a second engagement rate, and a selection of a third weight corresponding to a third engagement rate, wherein the first engagement rate and the second engagement rate correspond to positive engagement rates and wherein the third engagement rate corresponds to a negative engagement rate;
receive a set of transmission frequency groups for a plurality of digital communications, a number of users corresponding to each transmission frequency group of the set of transmission frequency groups such that the number of users for a transmission frequency group have received a digital communication of the plurality of digital communications at a respective receive rate for the transmission frequency group, and the first engagement rate, the second engagement rate, and the third engagement rate for the set of transmission frequency groups, wherein the first engagement rate, the second engagement rate, and the third engagement rate are based at least in part on user engagement metadata corresponding to the plurality of digital communications processed by a server;

calculate a blended reward rate for the transmission frequency group of the set of transmission frequency groups based on the first weight, the first engagement rate, the second weight, and the second engagement rate corresponding to the transmission frequency group;

scale, for the transmission frequency group, the third engagement rate to generate a magnified penalty ratio for the transmission frequency group based on the third weight; and calculate, for the transmission frequency group, a blended target rate based on the blended reward rate and the magnified penalty ratio for the transmission frequency group.

17. The non-transitory computer-readable medium of claim 16, wherein the instructions to scale the third engagement rate for the transmission frequency group further are executable to:

calculate, for the transmission frequency group, a penalty ratio between the blended reward rate and the third engagement rate;

calculate, for the transmission frequency group, a scaling factor by shifting the penalty ratio for each frequency group based on the third weight to generate a shifted engagement rate ratio; and generate the magnified penalty ratio for the transmission frequency group based on the scaling factor and the third engagement rate for the transmission frequency group.

18. The non-transitory computer-readable medium of claim 16, wherein the instructions are further executable to:

calculate, at the client system, for the transmission frequency group, a predicted blended target number increase based on a redistribution of the number of users corresponding to the transmission frequency group based on the blended target rate for the transmission frequency group.

19. The non-transitory computer-readable medium of claim 18, wherein the instructions to calculate based on the redistribution further are executable to:

select a plurality of transmission frequency ranges from the set of transmission frequency groups;

redistribute, for each transmission frequency range of the plurality of transmission frequency ranges, a number of digital communication messages from each transmission frequency group of the set of transmission frequency groups outside of a transmission frequency range to transmission frequency groups within the transmission frequency range; and calculate, for each transmission frequency range of the plurality of transmission frequency ranges, a predicted target count based at least in part on the redistributed number of digital communication messages into the transmission frequency range and the blended target rate for each transmission frequency group in the transmission frequency range.

20. The non-transitory computer-readable medium of claim 16, wherein the instructions are further executable to:

receive a selection of a range of frequency groups, wherein the set of transmission frequency groups corresponds to the selected range.

* * * * *